(12) United States Patent
Atarashi et al.

(10) Patent No.: US 8,335,267 B2
(45) Date of Patent: Dec. 18, 2012

(54) MOBILE STATION AND A BASE STATION

(75) Inventors: Hiroyuki Atarashi, Yokohama (JP);
Nobuhiko Miki, Yokohama (JP);
Kenichi Higuchi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1073 days.

(21) Appl. No.: 12/278,727

(22) PCT Filed: Feb. 7, 2007

(86) PCT No.: PCT/JP2007/052139
§ 371 (c)(1),
(2), (4) Date: Oct. 21, 2008

(87) PCT Pub. No.: WO2007/091605
PCT Pub. Date: Aug. 16, 2007

(65) Prior Publication Data
US 2009/0175369 A1    Jul. 9, 2009

(30) Foreign Application Priority Data
Feb. 8, 2006   (JP) ................................. 2006-031748

(51) Int. Cl.
*H04K 1/10* (2006.01)
(52) U.S. Cl. ......... 375/260; 370/208; 370/210; 370/204
(58) Field of Classification Search .................. 375/260; 370/208; 455/557
See application file for complete search history.

(56) References Cited

U.S. PATENT DOCUMENTS

| | | | |
|---|---|---|---|
| 6,208,663 B1 | 3/2001 | Schramm et al. | |
| 7,027,836 B2 * | 4/2006 | Zacks et al. | 455/557 |
| 7,110,351 B2 * | 9/2006 | Steer et al. | 370/208 |
| 7,137,047 B2 * | 11/2006 | Mitlin et al. | 714/704 |
| 2002/0037000 A1 | 3/2002 | Park et al. | |
| 2002/0046379 A1 | 4/2002 | Miki et al. | |
| 2003/0072285 A1 | 4/2003 | Onggosanusi et al. | |

(Continued)

FOREIGN PATENT DOCUMENTS

CN    1277766 A    12/2000

(Continued)

OTHER PUBLICATIONS

International Search Report w/translation from PCT/JP2007/052139 dated May 29, 2007 (5 pages).

(Continued)

*Primary Examiner* — Eva Puente
(74) *Attorney, Agent, or Firm* — Osha Liang LLP

(57) ABSTRACT

A mobile station includes a control unit configured to change at least one parameter for a retransmission packet from that of a transmission packet, where the at least one parameter is selected from a data modulation scheme; a channel coding rate; a puncturing pattern; a spreading factor; a frequency bandwidth; a frequency allocation position; and transmission power. A base station includes a retransmission format determining unit configured to determine a pattern used for changing at least one parameter for a retransmission packet from that of a transmission packet to determine a format for the retransmission packet, where the at least one parameter is selected from a data modulation scheme; a channel coding rate; a puncturing pattern; a spreading factor; a frequency bandwidth; a frequency allocation position; and transmission power; and a control signal generating unit configured to generate a control signal based on the format for the retransmission packet determined by the retransmission format determining unit.

13 Claims, 22 Drawing Sheets

U.S. PATENT DOCUMENTS

| | | | |
|---|---|---|---|
| 2005/0238053 A1 | 10/2005 | Iochi et al. | |
| 2006/0114813 A1* | 6/2006 | Seki et al. | 370/208 |
| 2006/0203924 A1* | 9/2006 | Casaccia et al. | 375/260 |

FOREIGN PATENT DOCUMENTS

| | | | |
|---|---|---|---|
| CN | 1336771 A | | 2/2002 |
| CN | 1359205 A | | 7/2002 |
| EP | 1615365 A1 | | 1/2006 |
| JP | 2001-508958 A | | 7/2001 |
| JP | 2003-179974 A | | 6/2003 |
| JP | 2004-104293 A | | 4/2004 |
| JP | 2004104574 A | | 4/2004 |
| JP | 2005-528058 A | | 9/2005 |
| WO | 99/12303 A1 | | 3/1999 |
| WO | 03/019844 A2 | | 3/2003 |
| WO | 2005/004376 A1 | | 1/2005 |

OTHER PUBLICATIONS

Written Opinion from PCT/JP2007/052139 dated May 29, 2007 (3 pages).

3GPP TS 25.212 V6.7.0 "Multiplexing and Channel Coding (FDD)" Dec. 2005, 84 pages.

3GPP TS 25.309 V6.5.0 "Overall Description" Dec. 2005, 34 pages.

Japanese Office Action for Application No. 2006-031748, mailed on May 25, 2010 (6 pages).

esp@cenet Patent Abstract for Publication No. WO 2005/004376, publication date Jan. 13, 2005. (1 page).

European Search Report and Written Opinion for Application No. 07708178.4, mailed on May 4, 2011, 12 pages.

esp@cenet Patent Abstract for Chinese Publication No. 1336771, publication date Feb. 20, 2002. (1 page).

esp@cenet Patent Abstract for Chinese Publication No. 1359205, publication date Jul. 17, 2002. (1 page).

esp@cenet Patent Abstract for Chinese Publication No. 1277766, publication date Dec. 20, 2000. (1 page).

Patent Abstracts of Japan for Japanese Publication No. 2004-104293, publication date Apr. 2, 2004 (1 page).

Chinese Office Action for Application No. 200780012694.9, mailed on Jun. 22, 2011 (17 pages).

* cited by examiner

FIG.8

|  | INITIAL TRANSMISSION PACKET | RETRANSMISSION PACKET (FIRST RETRANSMISSION) | RETRANSMISSION PACKET (SECOND RETRANSMISSION) | RETRANSMISSION PACKET (THIRD RETRANSMISSION) |
|---|---|---|---|---|
| DATA MODULATION SCHEME | Mod1 | Mod2 | Mod3 | ⋯ |
| CHANNEL CODING RATE | R1 | R2 | R3 | |
| SPREADING FACTOR | SF1 | SF2 | SF3 | |
| FREQUENCY BANDWIDTH | BW1 | BW2 | BW3 | |
| FREQUENCY ALLOCATION POSITION | Pos1 | Pos2 | Pos3 | |
| TRANSMISSION POWER | P1 | P2 | P3 | |
| TRANSMITTING ANTENNA, TRANSMISSION MODE | Tx1 | Tx2 | Tx3 | |

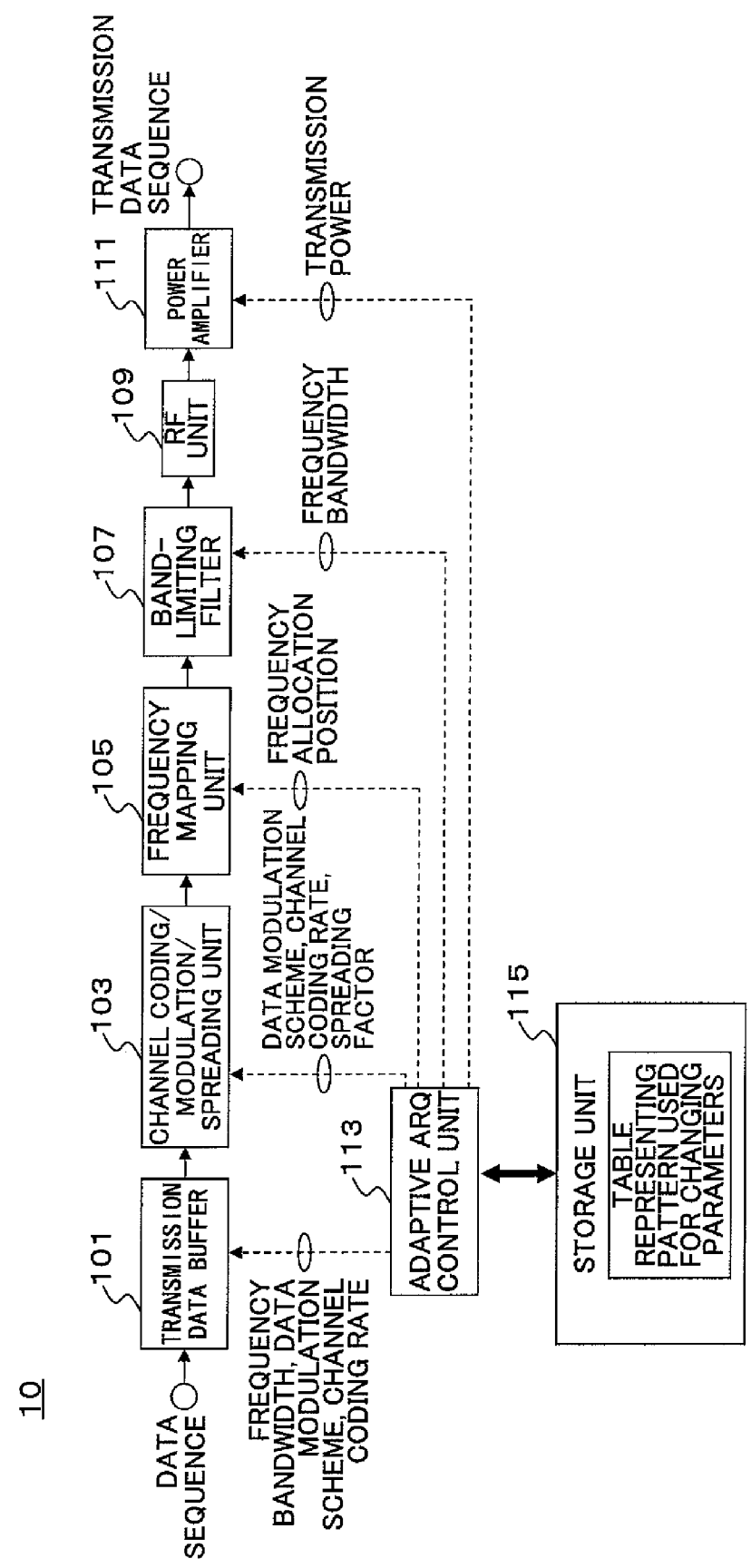

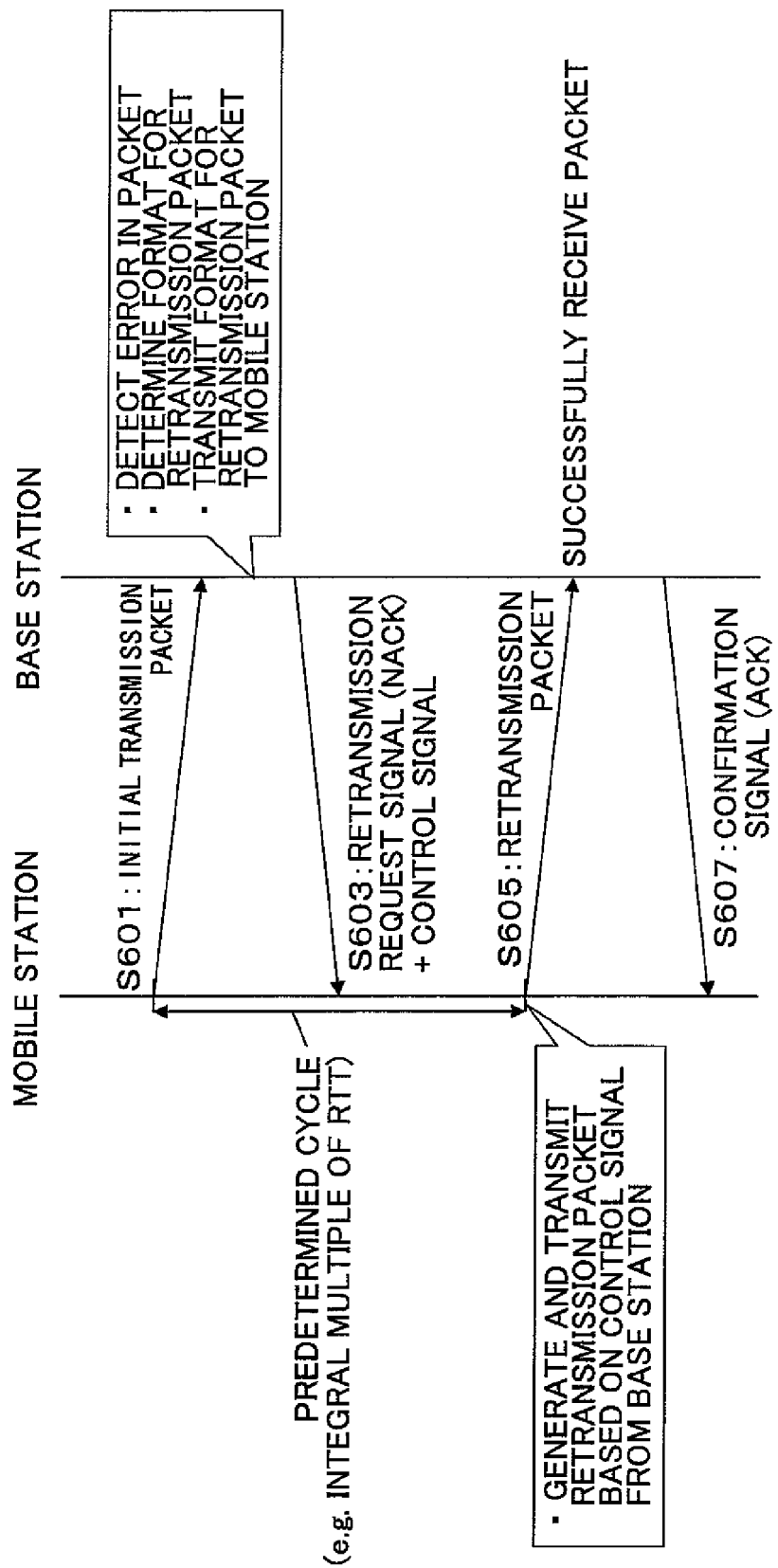

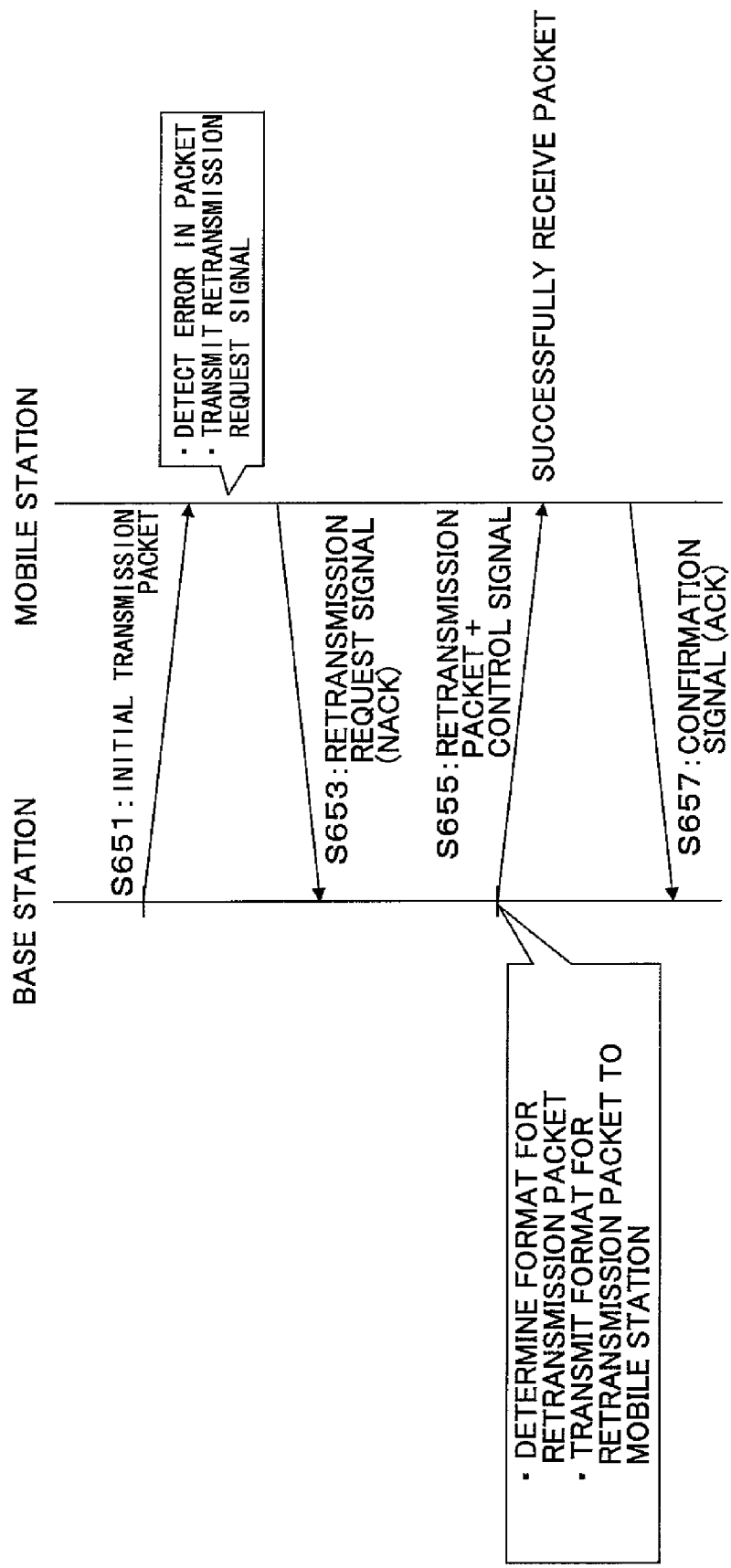

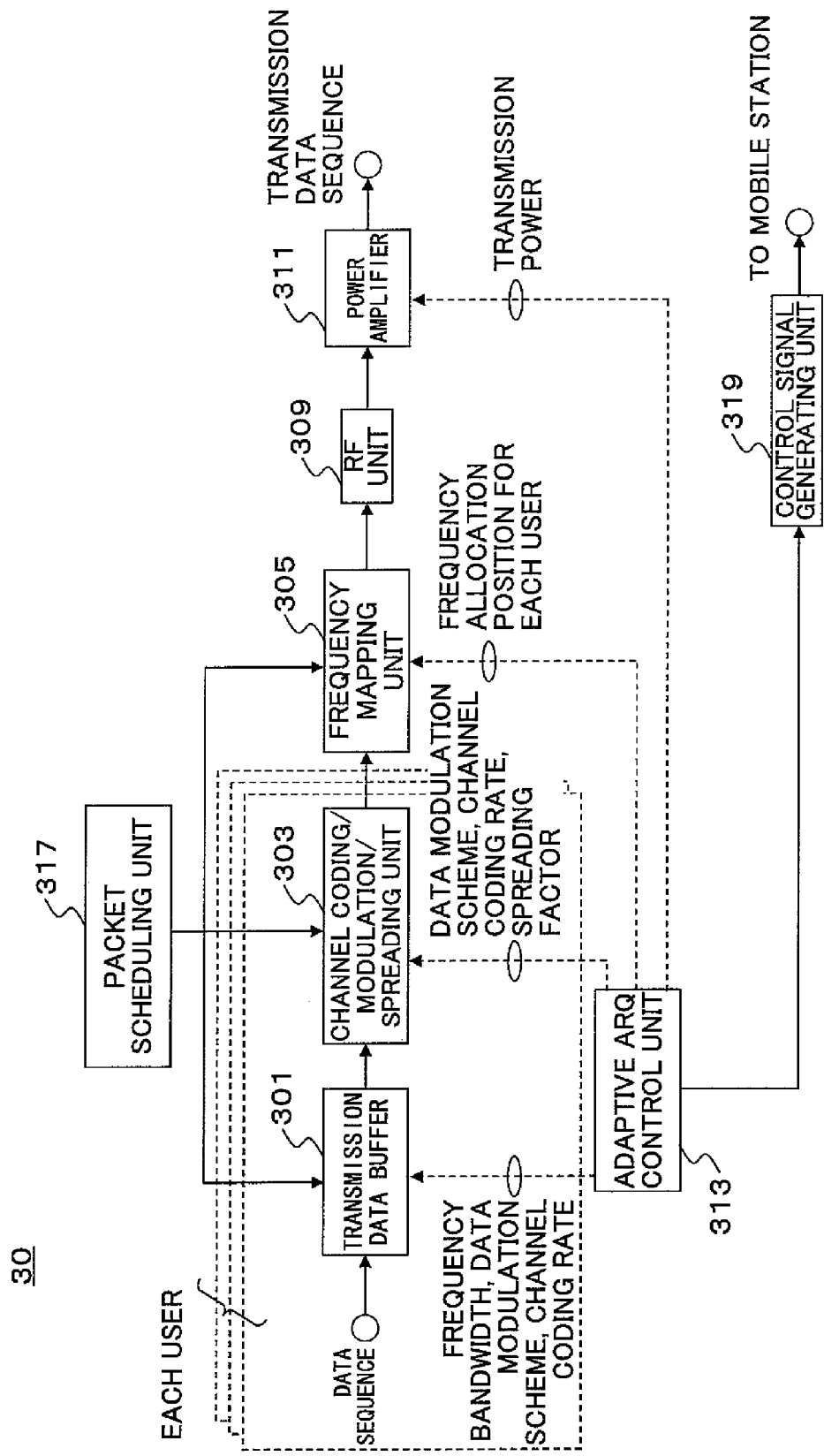

MOBILE STATION AND A BASE STATION

BACKGROUND OF THE INVENTION

1. Field of the Invention

The present invention relates to a mobile station for transmitting a retransmission packet corresponding to a transmission packet to a base station according to a synchronous retransmission control scheme in single-carrier FDMA (Frequency Division Multiple Access) radio access. The present invention also relates to a base station for transmitting a control signal to the mobile station.

In addition, the present invention relates to a base station for transmitting a retransmission packet corresponding to a transmission packet to a mobile station in multi-carrier OFDM (Orthogonal Frequency Division Multiplexing) radio access.

2. Description of the Related Art

Retransmission control schemes are used in radio communication systems, in which an error in a packet transmitted between a base station and a mobile station is detected and only a packet with the error is retransmitted. Regarding retransmission timings, retransmission control is classified into two schemes as shown in FIG. One scheme is referred to as Synchronous ARQ (automatic repeat request) and the other scheme is referred to as Asynchronous ARQ.

According to Synchronous ARQ, packets are retransmitted at predetermined retransmission timings. For example, when a transmission packet at a timing #0 (S00) is detected as an error packet, the corresponding retransmission packets can be transmitted at timings #0 (S10 and S20). In other words, retransmissions are performed at frames which are integral multiples of RTT (Round Trip Time) or control loop delay.

According to Asynchronous ARQ, packets are retransmitted at any timing after one RTT. For example, when a transmission packet at a timing #0 (A00) is detected as an error packet, the corresponding retransmission packets can be transmitted at any TTI (Transmission Time Interval) after A10. In other words, retransmissions are performed at any TTI (A10-A25) after one RTT from the transmission packet.

Regarding the format for the retransmission packet, the retransmission control is also classified into two schemes. One scheme is referred to as Non-adaptive ARQ and the other scheme is referred to as Adaptive ARQ.

According to Non-Adaptive ARQ, a retransmission packet is transmitted with the same format as an initial transmission packet. For example, when the initial transmission packet is transmitted with a channel coding rate (R) of ½ and a data modulation scheme of QPSK, the retransmission packet is transmitted with the same channel coding rate (R=½) and the same data modulation scheme (QPSK).

According to Adaptive ARQ, the retransmission packet is transmitted with a different format from the initial transmission packet. For example, when the initial transmission packet is transmitted with a channel coding rate (R) of ½ and a data modulation scheme of QPSK, the retransmission packet is transmitted with a different channel coding rate (R=⅓) and a different data modulation scheme (BPSK).

The combination of Asynchronous ARQ and Adaptive ARQ is used in HSDPA (High Speed Downlink Packet Access), which is a downlink high speed packet transmission technology for WCDMA (Wideband Code Division Multiple Access) (see 3GPP TS 25.212, "Multiplexing and channel coding (FDD)", for example).

The combination of Synchronous ARQ and Non-adaptive ARQ is used in Enhanced Uplink, which is an uplink high speed packet transmission technology for WCDMA (see 3GPP TS25.309, "FDD enhanced uplink; Overall description; Stage 2", for example).

According to typical WCDMA, a frequency bandwidth allocated to each user is fixed (always 5 MHz). Thus, a retransmission packet is transmitted with the same frequency bandwidth as a transmission packet. Accordingly, when the frequency bandwidth has strong interference from neighbor cells, it is expected that the retransmission packet will be of poor reception quality.

SUMMARY OF THE INVENTION

Problem(s) to be Solved by the Invention

According to Evolved UTRA (Evolved Universal Terrestrial Radio Access) under discussion in 3GPP (The 3rd Generation Partnership Project, for example, a frequency bandwidth allocated to each user in uplink single-carrier FDMA radio access can be variable. In addition, a frequency allocation position can be changeable due to FDMA.

Accordingly, it is a first object of the present invention to improve reception quality of a retransmission packet according to Synchronous ARQ in single-carrier FDMA radio access, by changing at least one parameter for the retransmission packet from that of a transmission packet, where the at least one parameter is selected from a puncturing pattern, a spreading factor, a frequency bandwidth, a frequency allocation position, and transmission power, in addition to a channel coding rate, and a data modulation scheme.

Furthermore, according to Evolved UTRA, for example, a frequency bandwidth allocated to each user in downlink multi-carrier OFDM radio access can be variable. In addition, a frequency allocation position can be changeable due to FDMA.

Accordingly, it is a second object of the present invention to improve reception quality of a retransmission packet in multi-carrier OFDM radio access, by changing at least one parameter for the retransmission packet from that of a transmission packet, where the at least one parameter is selected from a puncturing pattern, a spreading factor, a frequency bandwidth, a frequency allocation position, and transmission power, in addition to a channel coding rate, and a data modulation scheme.

Means for Solving the Problem

In one embodiment of the present invention, there is provided a mobile station for transmitting a retransmission packet corresponding to a transmission packet to a base station according to a synchronous retransmission control scheme in single-carrier FDMA (Frequency Division Multiple Access) radio access, comprising:

a control unit configured to change at least one parameter for the retransmission packet from that of the transmission packet, where the at least one parameter is selected from
  a data modulation scheme;
  a channel coding rate;
  a puncturing pattern;
  a spreading factor;
  a frequency bandwidth;
  a frequency allocation position; and
  transmission power.

In one embodiment of the present invention, there is provided a base station for transmitting a control signal to a mobile station for transmitting a retransmission packet corresponding to a transmission packet according to a synchronous retransmission control scheme in single-carrier FDMA (Frequency Division Multiple Access) radio access, comprising:

a retransmission format determining unit configured to determine a pattern used for changing at least one parameter for the retransmission packet from that of the transmission packet to determine a format for the retransmission packet, where the at least one parameter is selected from
   a data modulation scheme;
   a channel coding rate;
   a puncturing pattern;
   a spreading factor;
   a frequency bandwidth;
   a frequency allocation position; and
   transmission power; and
a control signal generating unit configured to generate the control signal based on the format for the retransmission packet determined by the retransmission format determining unit.

In one embodiment of the present invention, there is provided a base station for transmitting a retransmission packet corresponding to a transmission packet to a mobile station in multi-carrier OFDM (Orthogonal Frequency Division Multiplexing) radio access, comprising:

a control unit configured to change at least one parameter for the retransmission packet from that of the transmission packet, where the at least one parameter is selected from
   a data modulation scheme;
   a channel coding rate;
   a puncturing pattern;
   a spreading factor;
   a frequency bandwidth;
   a frequency allocation position; and
   transmission power.

Effect of the Invention

According to an embodiment of the present invention, reception quality of a retransmission packet can be improved.

BRIEF DESCRIPTION OF THE DRAWINGS

FIG. 8 shows a table representing a pattern used for changing a parameter for a retransmission packet.

FIG. 9 shows a block diagram of a mobile station in accordance with a fifth embodiment of the present invention.

FIG. 10 shows a sequence diagram of a retransmission control scheme in accordance with a sixth embodiment of the present invention.

FIG. 21 shows a sequence diagram of a retransmission control scheme in accordance with a fifteenth embodiment of the present invention.

FIG. 22 shows a block diagram of a base station in accordance with the fifteenth embodiment of the present invention.

DESCRIPTION OF THE PREFERRED EMBODIMENTS

Figure 1:
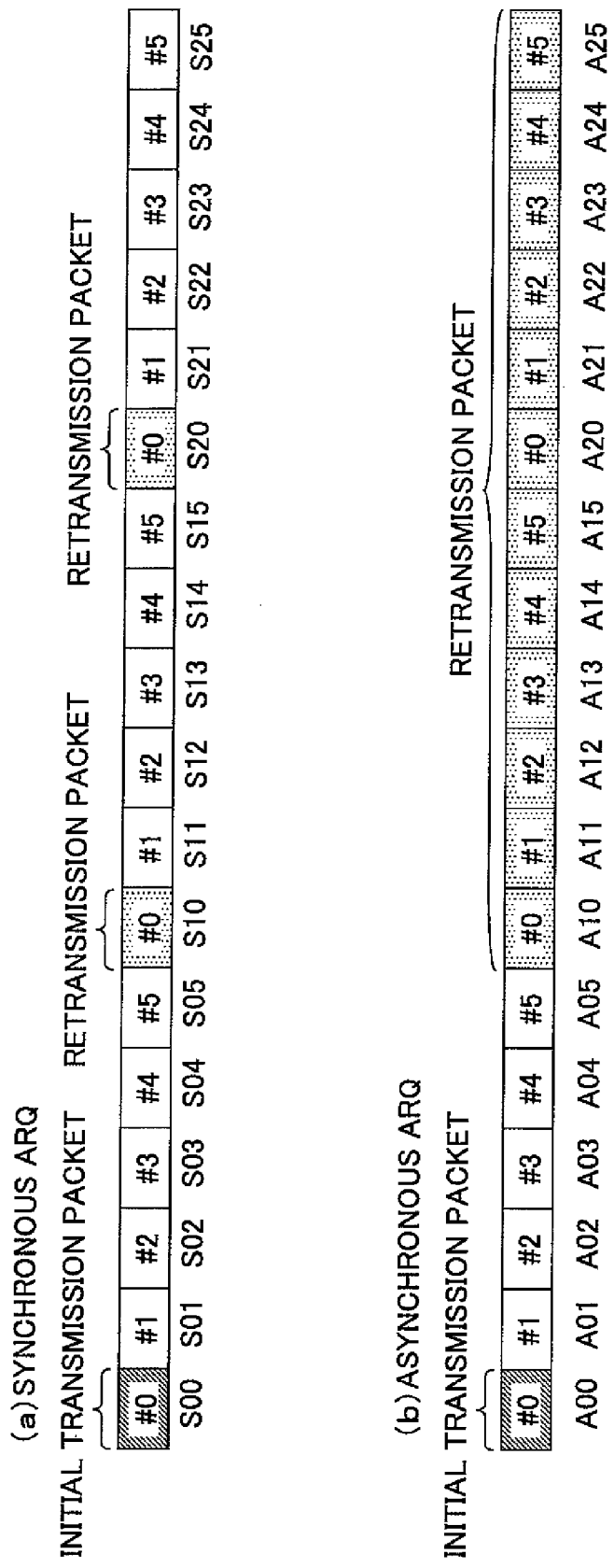
FIG. 1 shows a diagram illustrating Synchronous ARQ and Asynchronous ARQ.

Description of Notations 10 mobile station
101 transmission data buffer
103 channel coding/modulation/spreading unit
105 frequency mapping unit
107 band-limiting filter
109 RF unit
111 power amplifier
113 control unit
115 storage unit
20 base station
201 error detecting unit
203 retransmission format determining unit
205 control signal generating unit
30 base station
301 transmission data buffer
303 channel coding/modulation/spreading unit
305 frequency mapping unit
309 RF unit
311 power amplifier
313 control unit
315 storage unit
317 packet scheduling unit

BEST MODE OF CARRYING OUT THE INVENTION

With reference to the accompanying drawings, a description is given below with regard to preferred embodiments of the present invention.

Uplink Retransmission Control Scheme

In embodiments of the present invention for uplink transmission, the combination of Synchronous ARQ and Adaptive ARQ is used in single-carrier FDMA radio access.

Synchronous ARQ has the following advantages:
The process in a mobile station associated with retransmission timings can be simplified, because the mobile station need only transmit a retransmission packet at a predetermined cycle (integral multiples of RTT).
According to Asynchronous ARQ, signaling between a mobile station and a base station is needed to specify a timing for transmitting a retransmission packet. According to Synchronous ARQ, on the contrary, the base station need not specify a timing for transmitting a retransmission packet. Thus, overhead for control signals transmitted from the base station to the mobile station can be reduced.

Adaptive ARQ has the following advantages:
Selecting a suitable format for a retransmission packet improves the likelihood that a base station successfully receives the retransmission packet.
Selecting a suitable format for the retransmission packet, thus selecting a suitable frequency bandwidth and suitable transmission power used by a mobile station, reduces interference affecting the other mobile stations (users) simultaneously accessing the base station within the same cell or interference affecting neighbor cells.

First Embodiment

Figure 2:
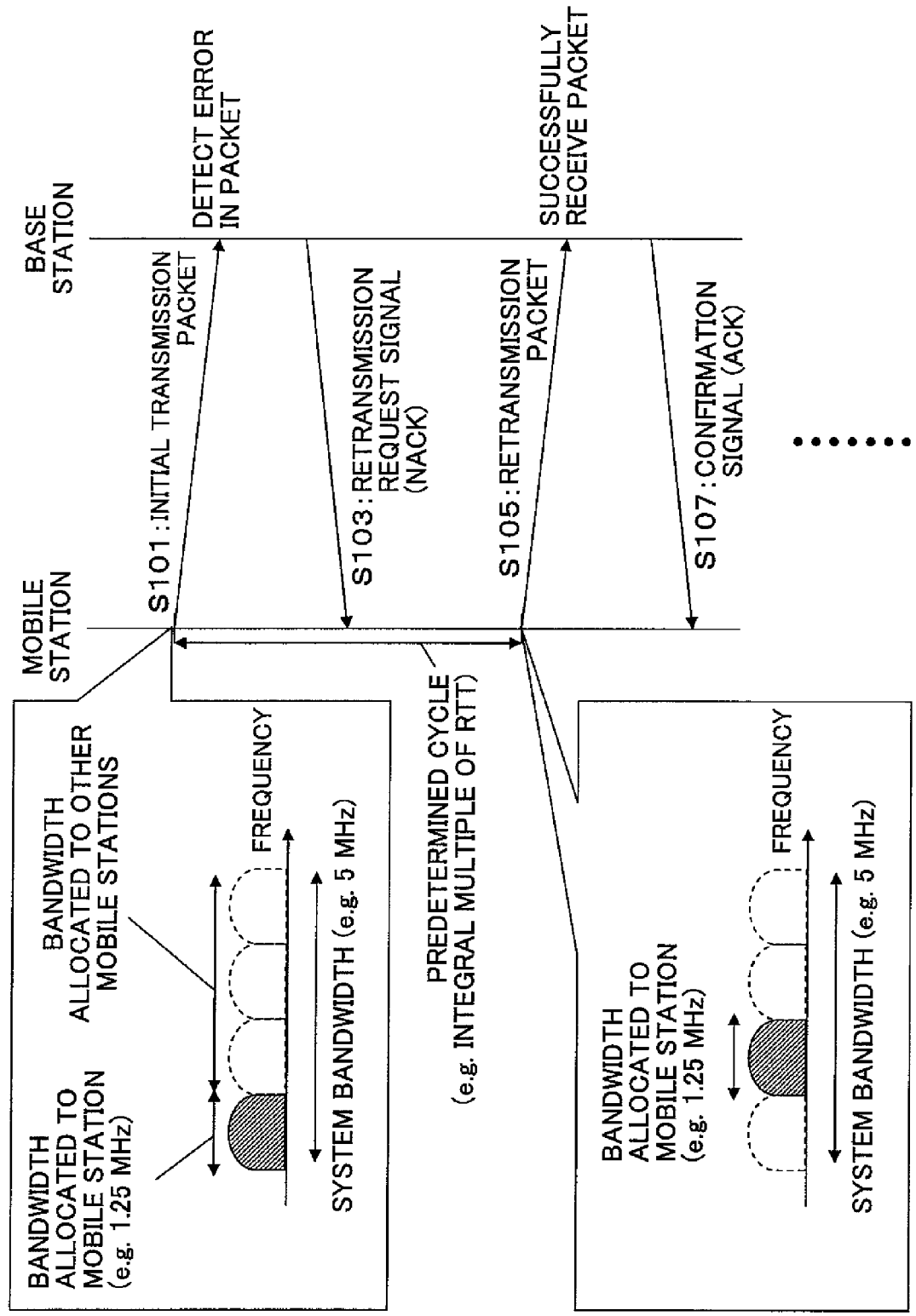
FIG. 2 shows a sequence diagram of a retransmission control scheme in accordance with a first embodiment of the present invention.

FIG. 2 shows a sequence diagram of a retransmission control scheme in accordance with a first embodiment of the present invention. In the first embodiment, a frequency allocation position for a retransmission packet is controlled.

As shown in FIG. 2, a mobile station transmits a transmission packet (also referred to as an initial transmission packet) with a predetermined format upon transmitting data to a base station (S101). For example, assuming that a system bandwidth of 5 MHz is divided into four bandwidths, the mobile station transmits the transmission packet with a first bandwidth of 1.25 MHz. The base station receives the transmission packet and detects an error in the packet. If the base station successfully receives the transmission packet, the base station transmits a confirmation signal (ACK: Acknowledgement) to the mobile station. Otherwise, the base station transmits a retransmission request signal (NACK: Negative Acknowledgement) to the mobile station (S103).

When the mobile station receives the retransmission request signal (NACK), the mobile station transmits a retransmission packet at a predetermined cycle (for example, integral multiples of RTT) (S105). According to the conventional retransmission control scheme, the mobile station transmits the retransmission packet with the same frequency allocation position (i.e. the first bandwidth of 1.25 MHz, when the system bandwidth of 5 MHz is divided into four bandwidths). Accordingly, when the frequency allocation position is of poor reception quality due to interference from neighbor cells, the retransmission packet is also likely to suffer interference from the neighbor cells. In the first embodiment, in order to solve this problem, the mobile station changes the frequency allocation position for the retransmission packet from that of the transmission packet. For example, the mobile station transmits the retransmission packet with a second bandwidth of 1.25 MHz, when the system bandwidth of 5 MHz is divided into four bandwidths. The base station receives the retransmission packets and detects an error in the packet. If the base station successfully receives the retransmission packet, the base station transmits a confirmation signal (ACK) to the mobile station (S107). Otherwise, the base station transmits a retransmission request signal (NACK) to the mobile station. When the mobile station receives the retransmission request signal (NACK) again, the mobile station changes the frequency allocation position as described above and transmits a retransmission packet. The mobile station continues to transmit a retransmission packet until the base station successfully receives the retransmission packet.

Figure 3:
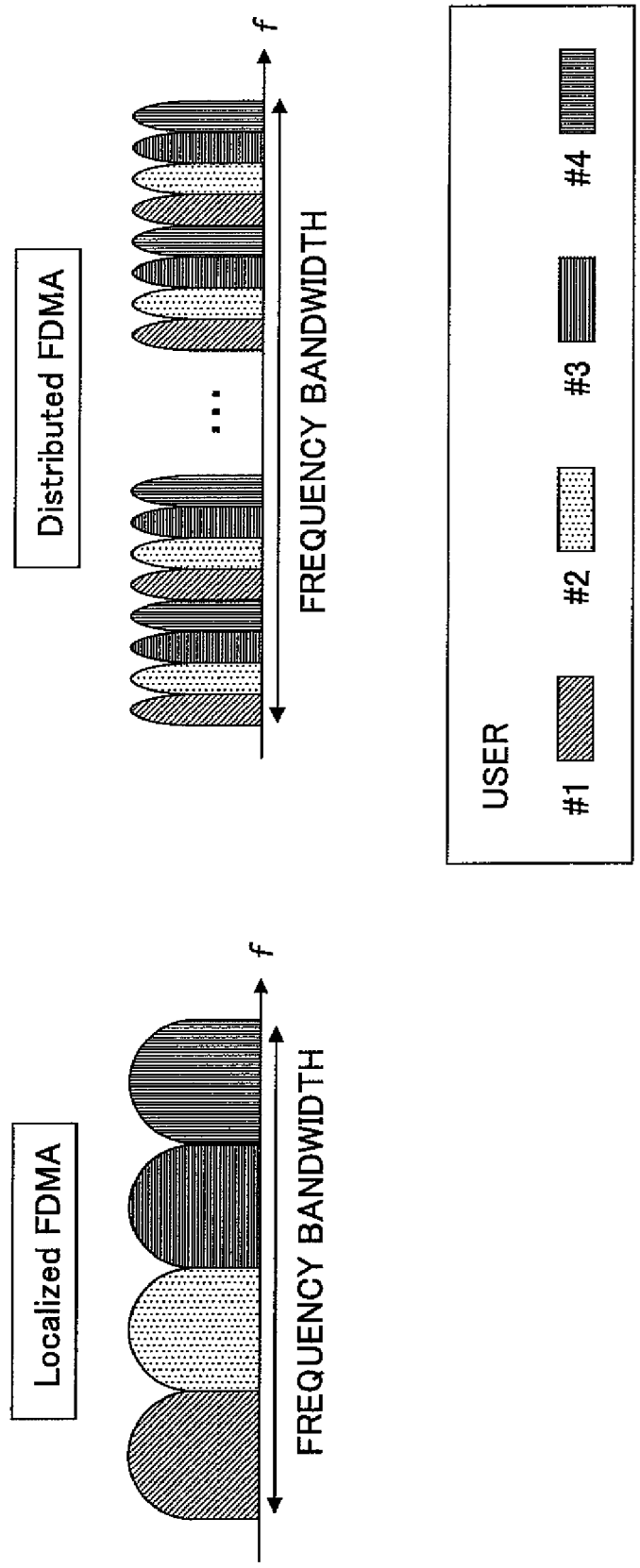
FIG. 3 shows approaches for allocating frequency bandwidths to multiple users.

In steps S101 and S105, upon transmitting the transmission packet or the retransmission packet for user data, the mobile station may allocate the frequency bandwidth by means of an approach referred to as Localized FDMA or Distributed FDMA as shown in FIG. 3. According to this approach, data for multiple users can be mutually orthogonalized in the frequency domain. Alternatively, data for multiple users may be mutually orthogonalized in the time domain.

The first embodiment, where the mobile station changes the frequency allocation position for the retransmission packet, has the following advantages:
The retransmission packet can avoid interference from neighbor cells when an error is detected in the initial transmission packet due to the interference.
A frequency diversity effect can be achieved by combining the initial transmission packet and the retransmission packet by means of an Incremental Redundancy scheme, for example. Thus, the likelihood that the base station successfully receives the retransmission packet can be improved.

Second Embodiment

Figure 4:
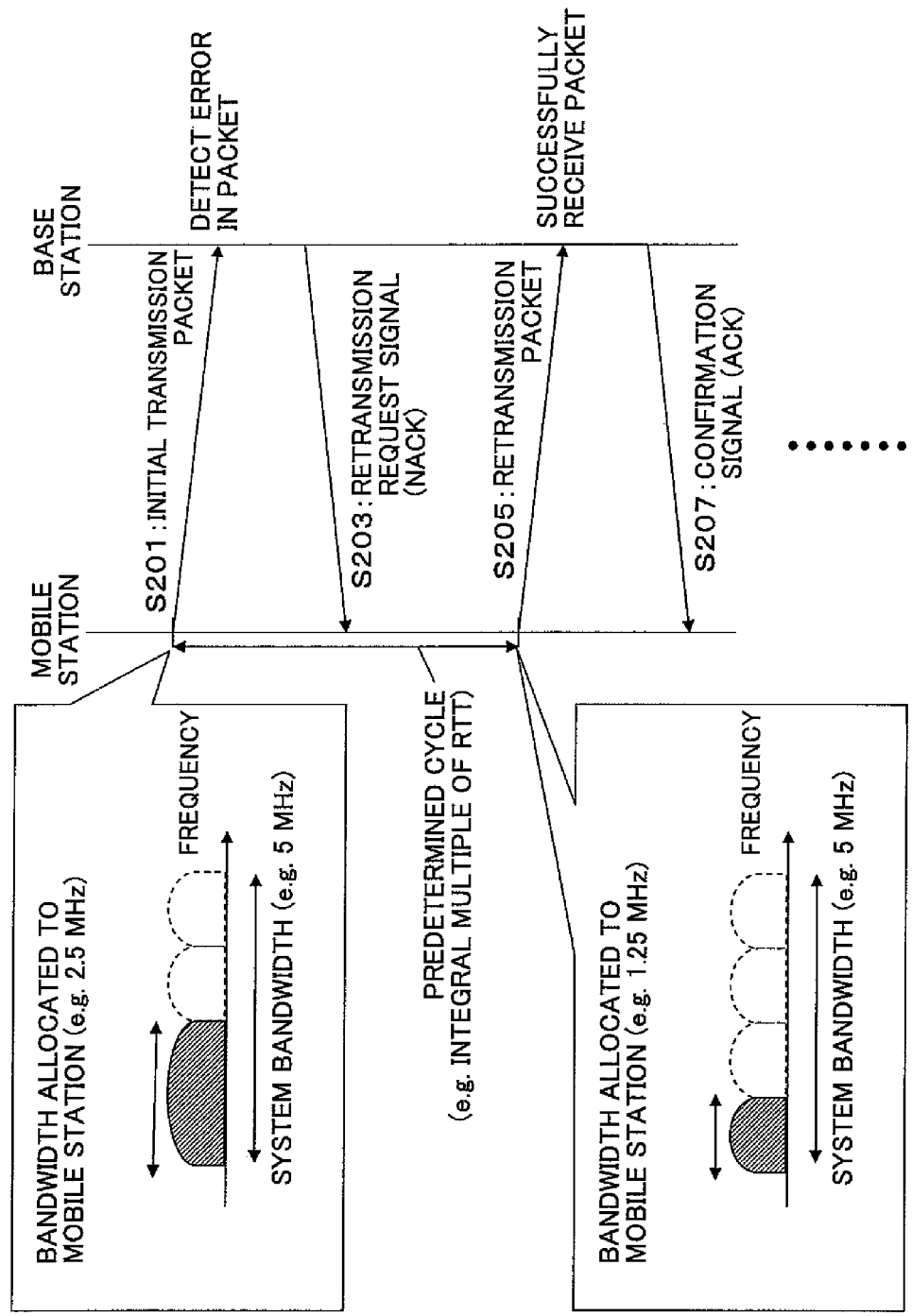
FIG. 4 shows a sequence diagram of a retransmission control scheme in accordance with a second embodiment of the present invention.

FIG. 4 shows a sequence diagram of a retransmission control scheme in accordance with a second embodiment of the present invention. In the second embodiment, a frequency bandwidth for a retransmission packet is controlled.

As is the case with the first embodiment, a mobile station transmits a transmission packet with a predetermined format upon transmitting data to a base station (S201). For example, assuming that a system bandwidth is equal to 5 MHz, the mobile station transmits the transmission packet with a frequency bandwidth of 2.5 MHz. The base station receives the transmission packet and detects an error in the packet. If the base station fails to receive the transmission packet successfully, the base station transmits a retransmission request signal (NACK) to the mobile station (S203).

When the mobile station receives the retransmission request signal (NACK), the mobile station transmits a retransmission packet at a predetermined cycle (S205). In the second embodiment, the mobile station transmits the retransmission packet with a frequency bandwidth of 1.25 MHz, for example, when the system bandwidth is equal to 5 MHz. If the base station successfully receives the retransmission packet, the base station transmits a confirmation signal (ACK) to the mobile station (S207).

The second embodiment, where the mobile station changes the frequency bandwidth for the retransmission packet, has the following advantage:
When the amount of information for the retransmission packet is small, excessive bandwidths may not be allocated and the frequency efficiency can be improved.

It should be noted that the frequency bandwidth for the retransmission packet may be reduced for a user situated at a cell edge, for example, when the frequency bandwidth for the initial transmission packet is too large for the base station to receive it successfully. The mobile station can concentrate transmission power in the reduced frequency bandwidth, due to the fact that total available transmission power is often fixed. As a result, the likelihood that the base station successfully receives the retransmission packet can be improved.

Third Embodiment

Figure 5:
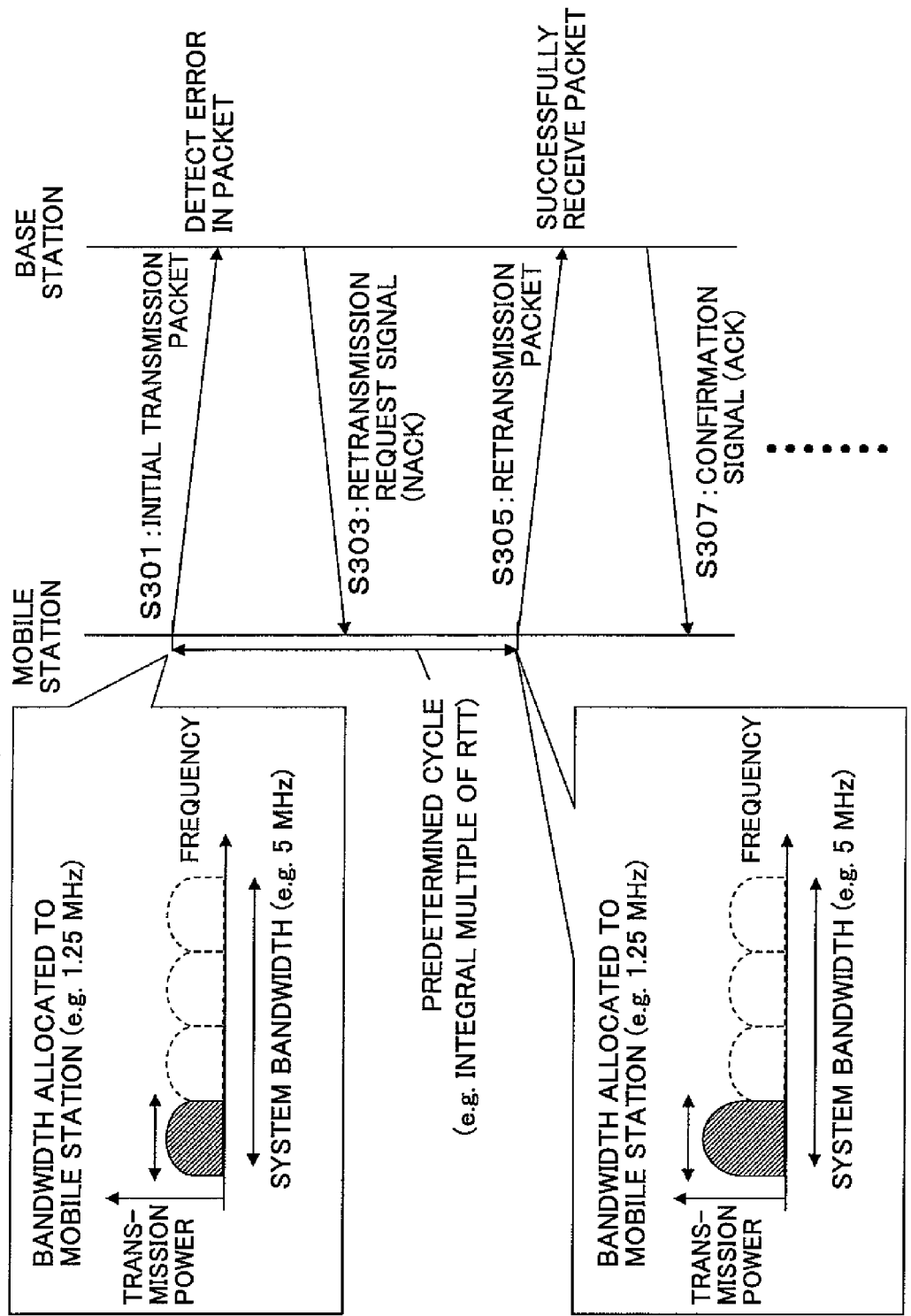
FIG. 5 shows a sequence diagram of a retransmission control scheme in accordance with a third embodiment of the present invention.

FIG. 5 shows a sequence diagram of a retransmission control scheme in accordance with a third embodiment of the present invention. In the third embodiment, transmission power for a retransmission packet is controlled.

As is the case with the first embodiment, a mobile station transmits a transmission packet with a predetermined format upon transmitting data to a base station (S301). For example, the mobile station transmits the transmission packet with normal transmission power. The base station receives the transmission packet and detects an error in the packet. If the base station fails to receive the transmission packet successfully, the base station transmits a retransmission request signal (NACK) to the mobile station (S303).

When the mobile station receives the retransmission request signal (NACK), the mobile station transmits a retransmission packet at a predetermined cycle (S305). In the third embodiment, the mobile station transmits the retransmission packet with higher transmission power. Alternatively, the mobile station may transmit the retransmission packet with lower transmission power. If the base station successfully receives the retransmission packet, the base station transmits a confirmation signal (ACK) to the mobile station (S307).

The third embodiment has the following advantage in the case where the mobile station increases the transmission power:

The likelihood that the base station successfully receives the retransmission packet can be improved compared to the likelihood for the initial transmission packet, due to higher transmission power.

The third embodiment has the following advantage in the case where the mobile station decreases the transmission power:

Assuming that the initial transmission packet and the retransmission packet are combined, reception quality can be improved by combining them. Accordingly, transmission power for the retransmission packet can be reduced and interference affecting the other users can be reduced.

In the first through third embodiments, a frequency allocation position, a frequency bandwidth, and transmission power are respectively controlled. In the same manner, multiple parameters including a channel coding rate and a data modulation scheme in addition to these three parameters may be simultaneously controlled. A spreading factor or a puncturing pattern for the retransmission packet may be also controlled. It should be noted that the puncturing pattern refers to a pattern representing how redundant bits are punctured (reduced) in the retransmission packet.

[Structure of a Mobile Station in Accordance with the First Through Third Embodiments]

Figure 6:
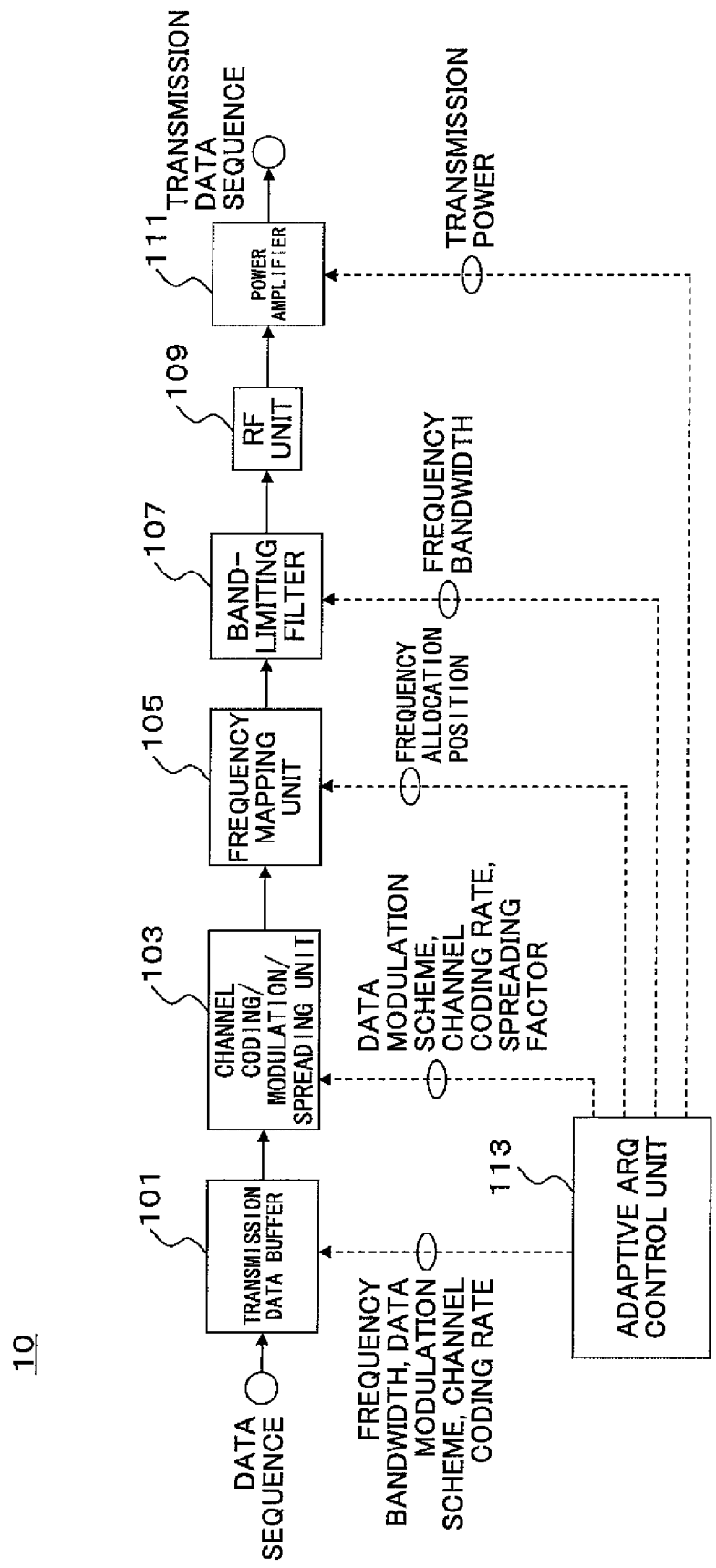
FIG. 6 shows a block diagram of a mobile station in accordance with an embodiment of the present invention.

FIG. 6 shows a block diagram of a mobile station 10 in accordance with the first through third embodiments of the present invention. The mobile station 10 includes a transmission data buffer 101, a channel coding/modulation/spreading unit 103, a frequency mapping unit 105, a band-limiting filter 107, an RF (Radio Frequency) unit 109, a power amplifier 111, and an Adaptive ARQ control unit (hereinafter referred to as a control unit) 113.

As described above, in response to a retransmission request signal (NACK) from a base station, the mobile station 10 generates and transmits a retransmission packet to the base station. Specifically, the transmission data buffer 101 receives information about a frequency bandwidth, a data modulation scheme, and a channel coding rate from the control unit 113 and temporarily stores data for the retransmission packet. The channel coding/modulation/spreading unit 103 receives information about the data modulation scheme, the channel coding rate, and a spreading factor from the control unit 113 and performs channel coding/modulation/spreading for the retransmission packet using these parameters. The channel coding/modulation/spreading unit 103 may perform channel coding and modulation after bit repetition. Alternatively, the channel coding/modulation/spreading unit 103 may puncture redundant bits by means of a predetermined puncturing pattern. The frequency mapping unit 105 receives information about a frequency allocation position from the control unit 113 and maps the retransmission packet to the frequency allocation position. The band-limiting filter 107 receives information about the frequency bandwidth from the control unit 113 and limits transmission signals to the frequency bandwidth. The RF unit 109 performs RF front-end processing such as orthogonal modulation. The power amplifier 111 receives information about transmission power from the control unit 113 and amplifies power up to the transmission power.

Fourth Embodiment

Figure 7:
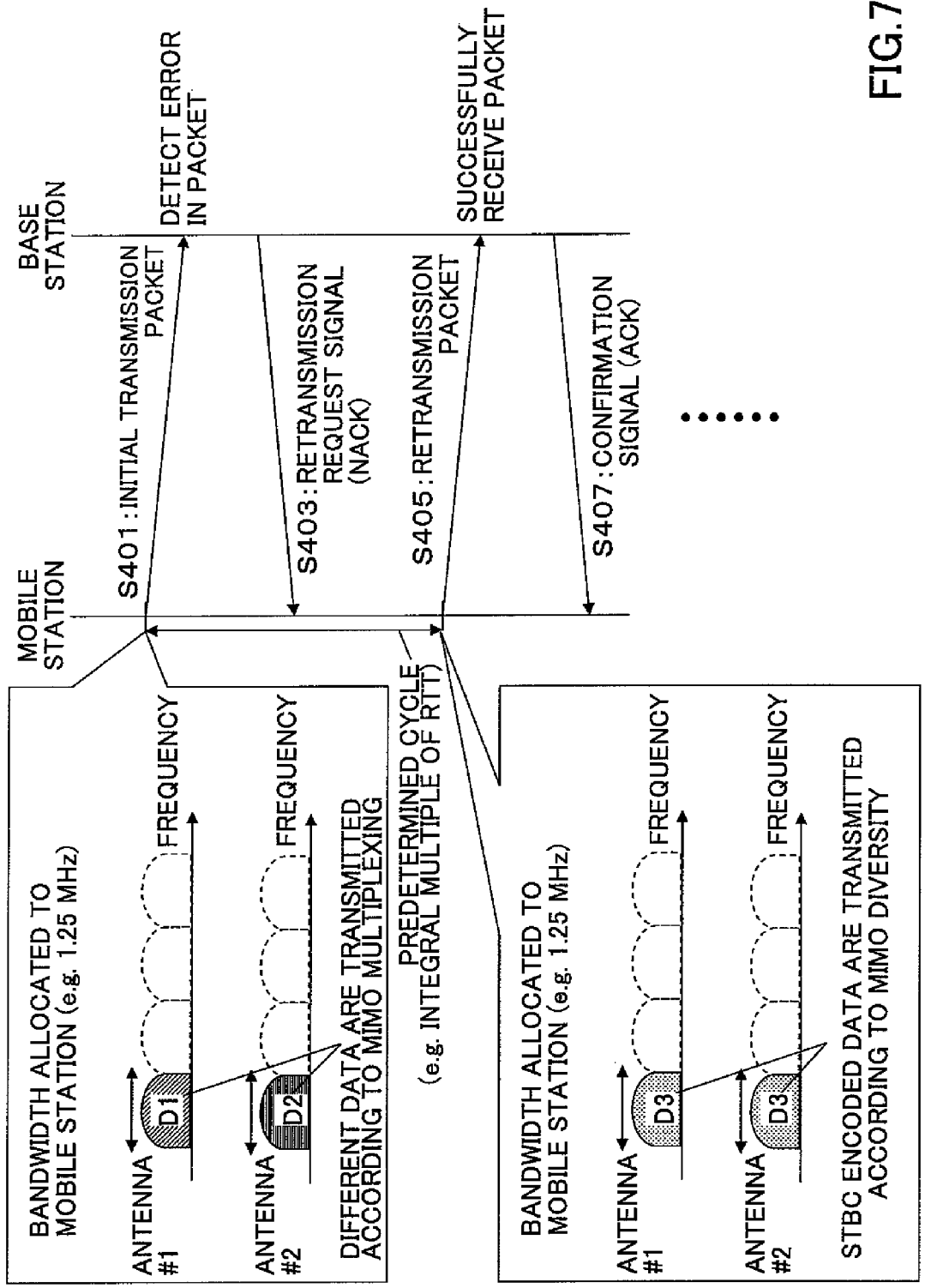
FIG. 7 shows a sequence diagram of a retransmission control scheme in accordance with a fourth embodiment of the present invention.

FIG. 7 shows a sequence diagram of a retransmission control scheme in accordance with a fourth embodiment of the present invention. In the fourth embodiment, a transmission mode for a retransmission packet is controlled, when MIMO (Multiple-Input Multiple-Output) transmission is performed between a base station and a mobile station.

As is the case with the first embodiment, a mobile station transmits a transmission packet with a predetermined transmission mode from multiple antennas upon transmitting data to a base station (S401). For example, the mobile station transmits different data from the respective antennas according to MIMO multiplexing. Specifically, the mobile station transmits data D1 and D2 from antennas #1 and #2, respectively. The base station receives the transmission packet and detects an error in the packet. If the base station fails to receive the transmission packet successfully, the base station transmits a retransmission request signal (NACK) to the mobile station (S403).

When the mobile station receives the retransmission request signal (NACK), the mobile station transmits a retransmission packet at a predetermined cycle (S405). In the fourth embodiment, the mobile station transmits the STBC (Space-Time Block Coding) encoded data D3 from the respective antennas according to MIMO diversity, for example. When data D1 and D2 are jointly encoded, data D3 may include redundancy bits used for decoding data D1 and D2. Alternatively, when data D1 and D2 are separately encoded, data D3 may include redundancy bits used for decoding erroneous data D1 or D2. If the base station successfully receives the retransmission packet, the base station transmits a confirmation signal (ACK) to the mobile station (S407).

The fourth embodiment, where the mobile station changes the transmission mode for the retransmission packet, has the following advantage:

A transmission diversity effect can be achieved by MIMO diversity as shown in FIG. 7. Accordingly, reception quality can be improved compared to the case where only MIMO multiplexing is used. Thus, a retransmission effect can be also improved by combining the initial transmission packet and the retransmission packet.

It should be noted that the number of transmitting antennas may be controlled in such a manner that two antennas are used for transmitting the transmission packet and one antenna is used for transmitting the retransmission packet.

Fifth Embodiment

In the first through fourth embodiments, a parameter for a retransmission packet is controlled. In a fifth embodiment, a pattern used for controlling the parameter is described.

In the case of Adaptive ARQ, both the base station and the mobile station must store common information about how to change a data modulation scheme, a channel coding rate, a puncturing pattern, a spreading factor, a frequency bandwidth, a frequency allocation position, and transmission power (as well as the number of transmitting antennas and a transmission mode in the case of MIMO transmission) as parameters for the retransmission packet.

For example, both the base station and the mobile station store a common table shown in FIG. 8. The table shown in FIG. 8 represents a pattern used for changing the parameters for the retransmission packet from those of the transmission packet. It should be noted that some fixed parameters may not be included in the table.

The mobile station determines a format for the retransmission packet with parameters, such as a data modulation scheme, a channel coding rate, a puncturing pattern, a spreading factor, a frequency bandwidth, a frequency allocation position, transmission power, the number of transmitting antennas, and a transmission mode, referring to the table, upon transmitting the retransmission packet. Because the base station also stores the common table, the base station can determine the format for the retransmission packet upon receiving the retransmission packet, and thus demodulate and decode the retransmission packet.

According to the fifth embodiment, where both the mobile station and the base station store the common table in advance, control signals transmitted from the mobile station to the base station can be eliminated, such as control signals for specifying a format which will be applied or has been applied to the retransmission packet. Thus, overhead for control signals can be reduced.

FIG. 9 shows a block diagram of a mobile station 10 in accordance with the fifth embodiment of the present invention.

The mobile station 10 shown in FIG. 9 is identical with the mobile station shown in FIG. 6 except for a storage unit 115. The storage unit 115 stores a table, as shown in FIG. 8, representing a pattern used for changing parameters according to Adaptive ARQ. The control unit 113 determines parameters for a retransmission packet referring to the pattern stored in the storage unit 115 upon transmitting the retransmission packet. The control unit 113 provides the parameters to the respective units 101-111 in order to transmit the retransmission packet.

Sixth Embodiment

FIG. 10 shows a sequence diagram of a retransmission control scheme in accordance with a sixth embodiment of the present invention. In the sixth embodiment, a pattern used for changing parameters for a retransmission packet (or a format for a retransmission packet) is transmitted from a base station to a mobile station.

As is the case with the first embodiment, a mobile station transmits a transmission packet with a predetermined format upon transmitting data to a base station (S601). The base station receives the transmission packet and detects an error in the packet. If the base station fails to receive the transmission packet successfully, the base station transmits a retransmission request signal (NACK) to the mobile station (S603). The base station also determines a format for the retransmission packet and transmits a control signal which specifies a pattern used for changing parameters for the retransmission packet. Alternatively, the base station may transmit a control signal which specifies the format (individual parameters) for the retransmission packet.

When the mobile station receives the retransmission request signal (NACK), the mobile station transmits a retransmission packet at a predetermined cycle (S605). In the sixth embodiment, the mobile station generates the retransmission packet with the parameters specified by the control signal and transmits the retransmission packet to the base station. If the base station successfully receives the retransmission packet, the base station transmits a confirmation signal (ACK) to the mobile station (S607).

According to the sixth embodiment, where the base station specifies the format for the retransmission packet, the common table in the fifth embodiment is not needed. Although the number of bits transmitted from the base station to the mobile station grows due to the control signal, a retransmission effect can be improved, because the base station can select suitable parameters in consideration of interference with neighbor cells or frequency allocation information for the other users.

Figure 11:
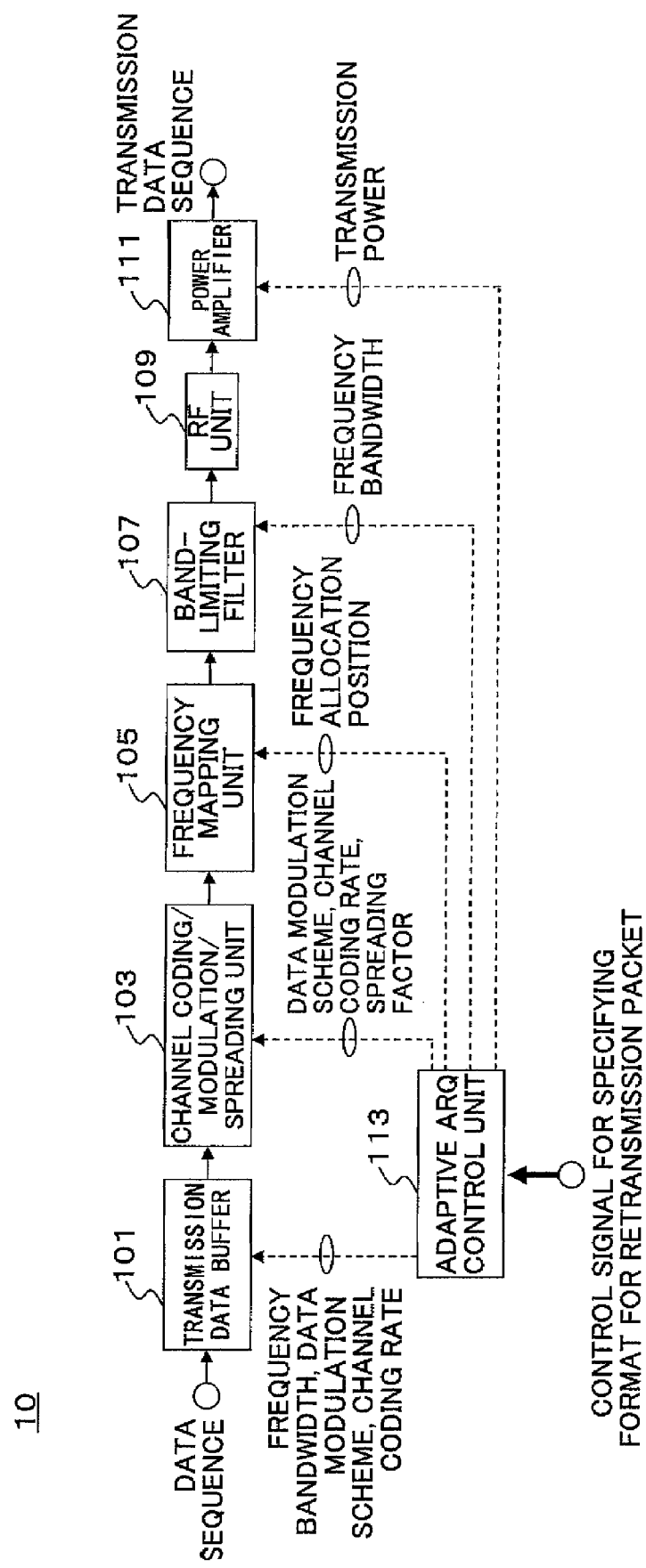
FIG. 11 shows a block diagram of a mobile station in accordance with the sixth embodiment of the present invention.

FIG. 11 shows a block diagram of a mobile station 10 in accordance with the sixth embodiment of the present invention.

The mobile station 10 shown in FIG. 11 is identical with the mobile station shown in FIG. 6 except that the control unit 113 receives a control signal which specifies a format for a retransmission packet. The control unit 113 determines parameters for the retransmission packet based on the format for the retransmission packet specified by the control signal. The control unit provides the parameters to the respective units 101-111 in order to transmit the retransmission packet with the specified format.

Figure 12:
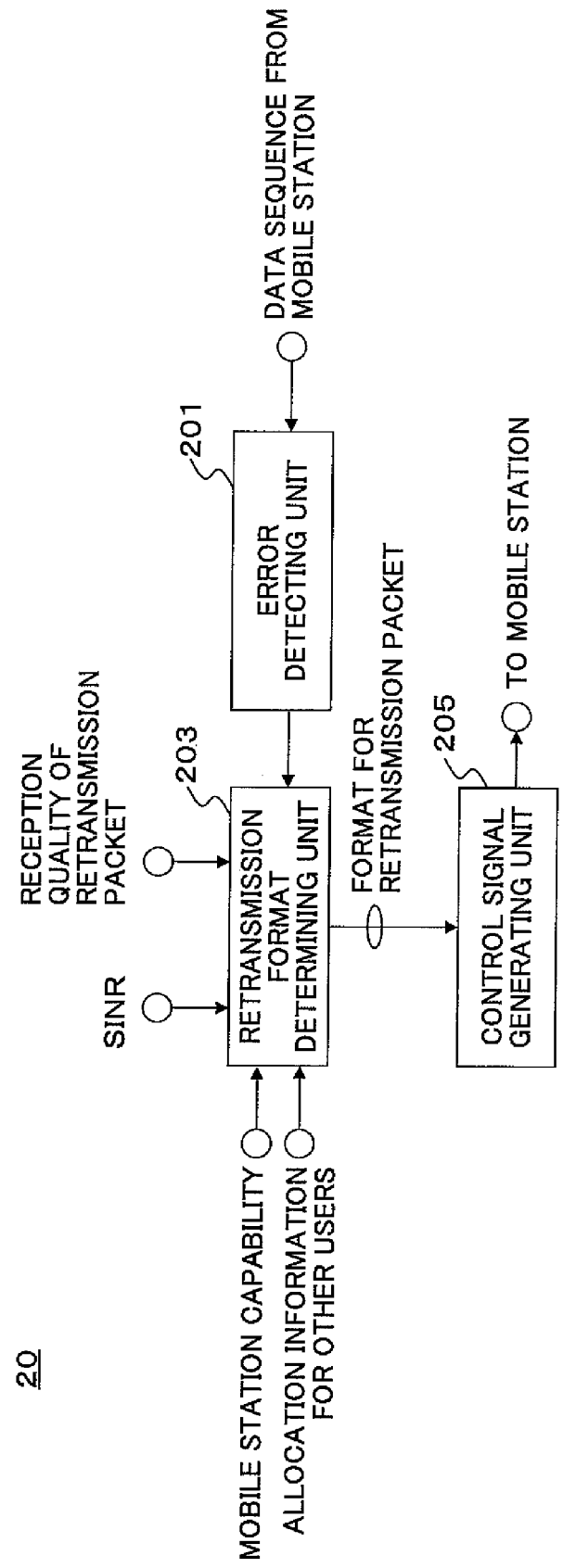
FIG. 12 shows a block diagram of a base station in accordance with the sixth embodiment of the present invention.

FIG. 12 shows a block diagram of a base station 20 in accordance with the sixth embodiment of the present invention.

The base station 20 includes an error detecting unit 201, a retransmission format determining unit 203, and a control signal generating unit 205.

The error detecting unit 201 receives a data sequence from the mobile station and detects an error. When the error is detected in the received data sequence, the retransmission format determining unit 203 determines a pattern used for changing parameters for the retransmission packet from those of the transmission packet based on reception quality information, such as signal reception quality (SINR: Signal to Interference plus Noise Ratio) or reception quality of the retransmission packet, to determine a format for the retransmission packet.

The retransmission format determining unit 203 may determine the format for the retransmission packet based on a mobile user capability (UE Capability: User Equipment Capability). The mobile user capability includes maximum transmission power, a maximum frequency bandwidth, an available transmission mode for MIMO transmission, the number of transmitting antennas, and so on. Because the mobile station has a limited capability, the base station may determine the format for the retransmission packet based on the mobile user capability. In addition, the retransmission format determining unit 203 may determine the format for the retransmission packet based on allocation information for the other users. For example, the retransmission packet determining unit 203 may change parameters for the retransmission packet such as a frequency bandwidth and a frequency allocation position based on the allocation information.

When the retransmission format determining unit 203 determines the format for the retransmission packet, the control signal generating unit 205 generates a control signal transmitted to the mobile station based on the format.

As described above, the parameters transmitted as the control signal to the mobile station include a data modulation scheme, a channel coding rate, a puncturing pattern, a spreading factor, a frequency bandwidth, a frequency allocation position, transmission power, the number of antennas (for example, one antenna or two antennas), a transmission mode (for example, MIMO diversity or MIMO multiplexing), a redundancy scheme used for encoding the packet, and information about whether the packet corresponds to the retransmission packet.

Seventh Embodiment

In a seventh embodiment of the present invention, some parameters are controlled based on common information stored in both a base station and a mobile station as described in the fifth embodiment. Some parameters are controlled based on a control signal transmitted from the base station to the mobile station, as described in the sixth embodiment.

In the following example, four parameters including a data modulation scheme, a frequency bandwidth, a frequency allocation position, and a channel coding rate (and a redundancy scheme used for encoding a packet) are controlled. The data modulation scheme and the frequency bandwidth are parameters with a significantly varying property depending upon a pattern used for changing parameters. On the other hand, the frequency allocation position and the channel coding rate (and the redundancy scheme used for encoding a packet) are parameters with a less significantly varying property depending upon the pattern used for changing parameters. Preferably, the parameters with the significantly varying property are transmitted as a control signal from the base station to the mobile station. On the other hand, the parameters with the less significantly varying property may not be transmitted as the control signal. Thus, the parameters with the less significantly varying property may be controlled based on common information stored in both the base station and the mobile station. For example, the channel coding rate is controlled according to a predetermined pattern such that the channel coding rate for the initial transmission packet is equal to $\frac{1}{2}$, that of the first retransmission packet is equal to $\frac{1}{3}$, and that of the second retransmission packet is equal to $\frac{1}{4}$.

According to the seventh embodiment, where the fifth embodiment and the sixth embodiment are combined depending upon the parameter, overhead for control signals can be reduced compared to the sixth embodiment, where all the parameters are transmitted as the control signal. Furthermore, according to the seventh embodiment, reception quality of the retransmission packet can be improved compared to the fifth embodiment, where all the parameters are stored in the base station and the mobile station in common.

Eighth Embodiment

In an eighth embodiment of the present invention, an item of parameters for a retransmission packet is controlled (selected) depending upon a type of data transmitted on a shared data channel.

Data with various QoS (Quality of Service) (for example, acceptable delay time, required residual packet error rate, and so on) are transmitted on the shared data channel. In this case, it may be preferable to control (select) an item of parameters depending upon the type of transmitted data.

For example, data are categorized into real-time traffic data such as voice or real-time video and non-real-time traffic data such as download data. For real-time traffic data, data are periodically generated, and thus it is preferable to maintain a constant data rate. In addition, real-time traffic data must typically satisfy strict requirements for delay. In order to maintain the constant data rate, the mobile station changes transmission power for the retransmission packet from that of the transmission packet, without changing parameters having a large influence on the data rate (for example, a frequency bandwidth, a data modulation scheme, a channel coding rate, a spreading factor). For non-real-time traffic, on the other hand, data are burst-generated and have less strict requirements for delay. Thus, best-effort transmission is allowed for non-real-time traffic. Because the mobile station need not maintain the constant data rate, the mobile station changes parameters such as a frequency bandwidth, a data modulation scheme, a channel coding rate, and a spreading factor without changing transmission power. In this manner, parameters for non-real-time traffic data are adaptively controlled to maximize throughput.

According to the eighth embodiment, where the item of parameters for the retransmission packet is controlled depending upon the type of data, QoS for the respective traffic data can be efficiently satisfied. The item of parameters for the retransmission packet can be selected as part of packet scheduling in the base station.

Figure 13:
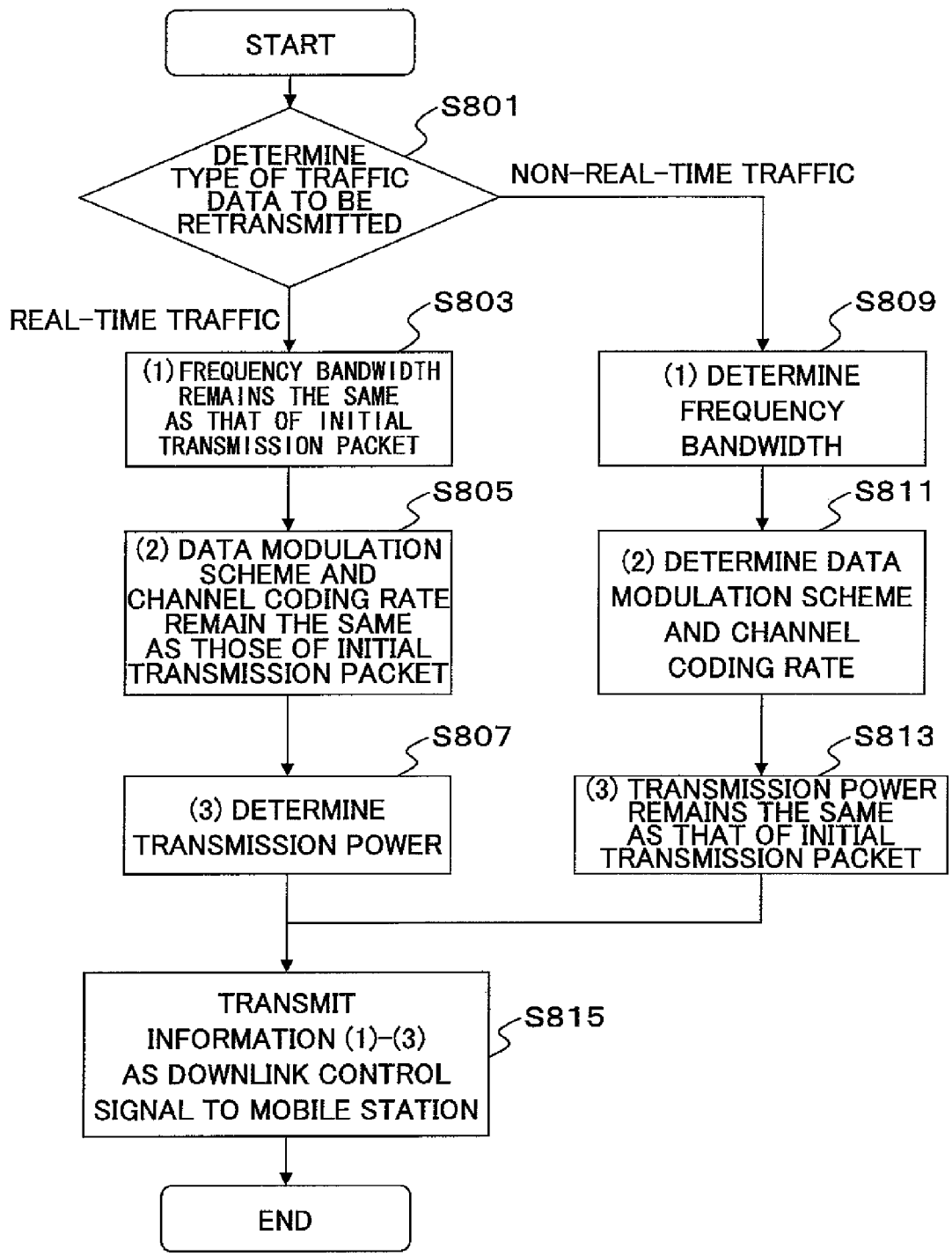
FIG. 13 shows a flowchart for generating a control signal in a base station in accordance with an eighth embodiment of the present invention.

With reference to FIG. 13, packet scheduling in the base station is described. FIG. 13 shows a flowchart for generating a control signal in the base station in accordance with the eighth embodiment of the present invention.

When a base station receives traffic data from a mobile station, the error detecting unit 201 detects an error. When the error is detected in the traffic data, the retransmission format determining unit 203 determines a type of data to be retransmitted (S801).

If the type of data is real-time traffic, a frequency bandwidth for a retransmission packet remains the same as that of an initial transmission packet (S803). A data modulation scheme and a channel coding rate also remain the same (S805). Then, the retransmission format determining unit 203 determines suitable transmission power (S807). These parameters are transmitted as a control signal to the mobile station (S815).

If the type of data is non-real-time traffic, the retransmission format determining unit 203 determines a suitable frequency bandwidth for the retransmission packet (S809). The retransmission format determining unit 203 also determines a suitable data modulation scheme and a suitable channel coding rate (S811). Transmission power for the retransmission packet remains the same as that of the initial transmission packet (S813). These parameters are transmitted as the control signal to the mobile station (S815).

Although FIG. 8 shows an example where the format for the retransmission packet is transmitted as the control signal from the base station to the mobile station, both the base station and the mobile station store a common table for each type of data, as described in the fifth embodiment, in order to eliminate the control packet. Specifically, the control unit 113 in the mobile station may determine the type of data transmitted to the base station, refer to the table depending upon the type of data, and determine the format for the retransmission packet.

Ninth Embodiment

In a ninth embodiment of the present invention, a parameter for a retransmission packet is adaptively controlled depending upon a size of the retransmission packet.

Figure 14:
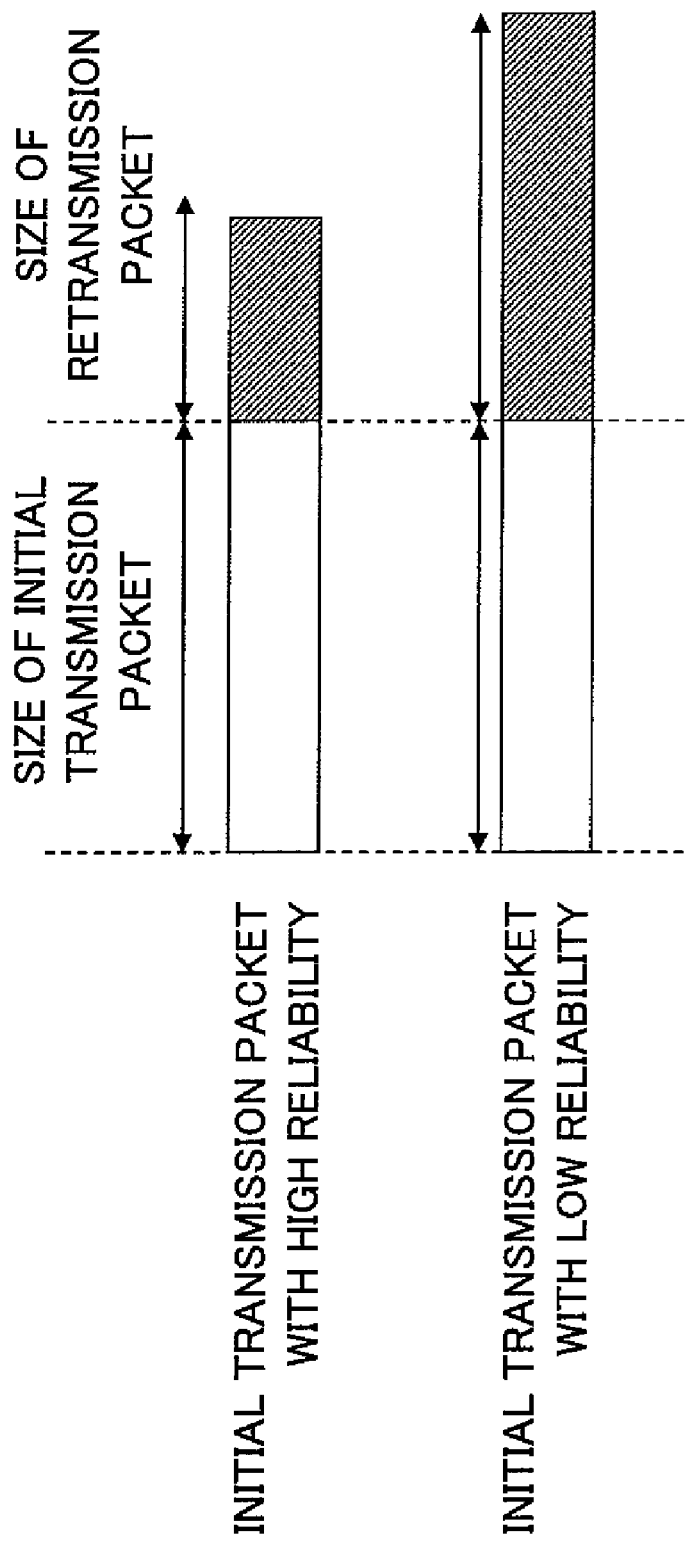
FIG. 14 shows an example for identifying a size of a retransmission packet in accordance with a ninth embodiment of the present invention.

As shown in FIG. 14, changing the size of the retransmission packet depending upon reliability of the erroneous initial transmission packet can improve the frequency efficiency. According to an Incremental Redundancy scheme for combining the initial transmission packet and the retransmission packet, for example, the number of redundant bits in the retransmission packet can be controlled depending upon the reliability of the initial transmission packet. For the initial transmission packet with high reliability, the number of redundant bits can be small. For the initial transmission packet with low reliability, the number of redundant bits can be large.

In this manner, under Adaptive ARQ, the parameter for the retransmission packet is adaptively controlled depending upon the number of redundant bits in the retransmission packet. For example, when the size of the retransmission packet is small, a narrower frequency bandwidth is allocated to the retransmission packet. On the contrary, when the size of the retransmission packet is large, a wider frequency bandwidth is allocated to the retransmission packet. According to the eighteenth embodiment, the frequency efficiency can be improved.

Downlink Retransmission Control Scheme

In embodiments of the present invention for downlink transmission, Adaptive ARQ is used in multi-carrier OFDM radio access. Because simplifying the process in a base station associated with retransmission timings is not much needed for downlink transmission, Synchronous ARQ or Asynchronous ARQ may be used.

Adaptive ARQ has the following advantages:
  Selecting a suitable format for a retransmission packet improves the likelihood that a mobile station successfully receives the retransmission packet.
  Selecting a suitable format for the retransmission packet, thus selecting a suitable frequency bandwidth and suitable transmission power used by a base station, reduces interference affecting the other mobile stations (users) simultaneously accessing the base station within the same cell or interference affecting neighbor cells.

Tenth Embodiment

Figure 15:
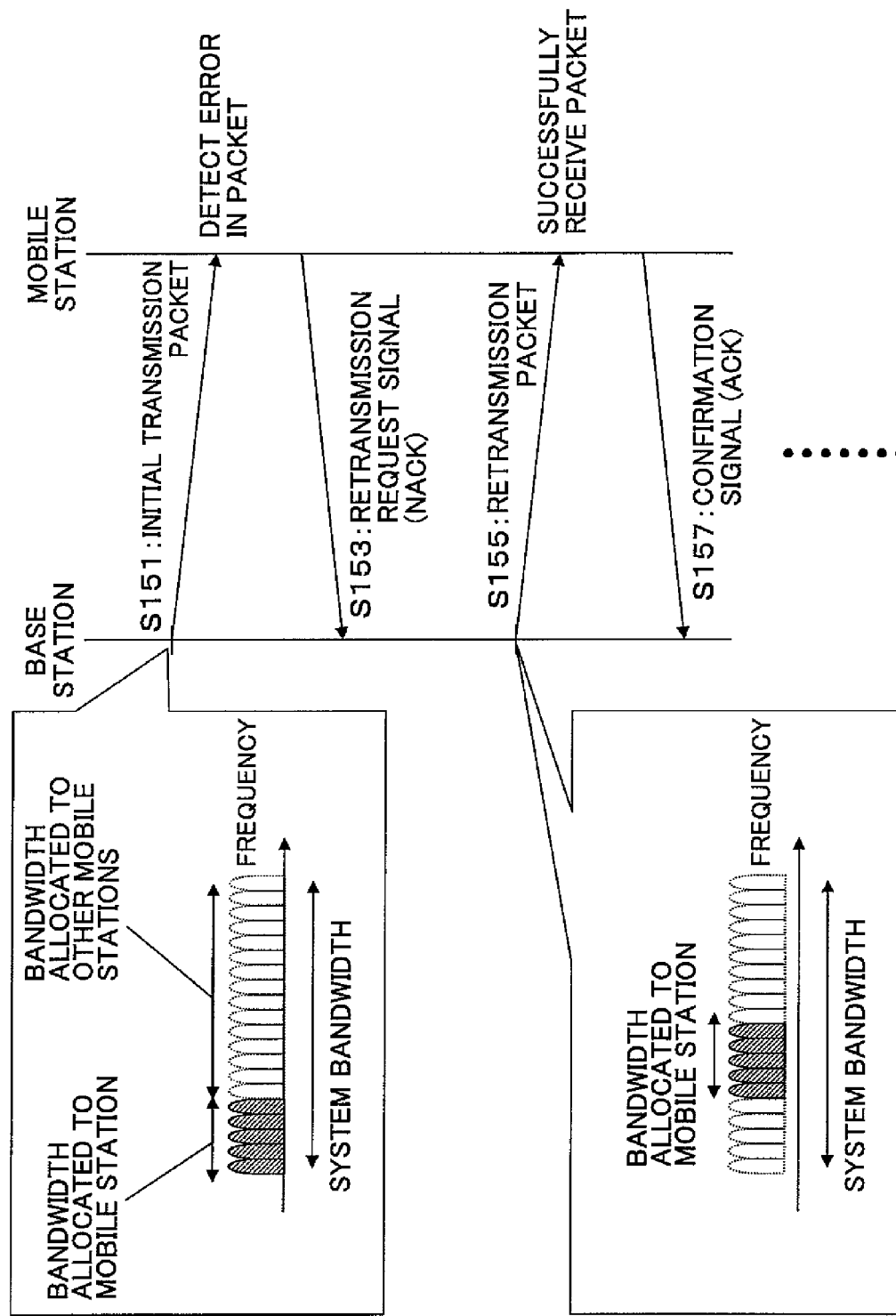
FIG. 15 shows a sequence diagram of a retransmission control scheme in accordance with a tenth embodiment of the present invention.

FIG. 15 shows a sequence diagram of a retransmission control scheme in accordance with a tenth embodiment of the present invention. In the tenth embodiment, a frequency allocation position for a retransmission packet is controlled.

As shown in FIG. 15, a base station transmits a transmission packet (also referred to as an initial transmission packet) with a predetermined format upon transmitting data to a mobile station (S151). For example, the mobile station transmits the transmission packet with a portion of a system bandwidth. The mobile station receives the transmission packet and detects an error in the packet. If the mobile station successfully receives the transmission packet, the mobile station transmits a confirmation signal (ACK) to the base station. Otherwise, the mobile station transmits a retransmission request signal (NACK) to the base station (S153).

When the base station receives the retransmission request signal (NACK), the base station transmits a retransmission packet according to Synchronous ARQ or Asynchronous ARQ (S155). According to the conventional retransmission control schemer the base station transmits the retransmission packet with the same frequency allocation position (i.e. the frequency allocation position used in step S151). Accordingly, when the frequency allocation position is of poor reception quality due to interference from neighbor cells, the retransmission packet is also likely to suffer interference from the neighbor cells. In the tenth embodiment, in order to solve this problem, the base station changes the frequency allocation position for the retransmission packet from that of the transmission packet. For example, the mobile station transmits the retransmission packet with a frequency allocation position which is different from the frequency allocation position used in step S151. The mobile station receives the retransmission packets and detects an error in the packet. If the mobile station successfully receives the retransmission packet, the mobile station transmits a confirmation signal (ACK) to the base station (S157). Otherwise, the mobile station transmits a retransmission request signal (NACK) to the base station. When the base station receives the retransmission request signal (NACK) again, the base station changes the frequency allocation position as described above and transmits a retransmission packet. The base station continues to transmit a retransmission packet until the mobile station successfully receives the retransmission packet.

The tenth embodiment, where the base station changes the frequency allocation position for the retransmission packet, has the following advantages:
  The retransmission packet can avoid interference from neighbor cells when an error is detected in the initial transmission packet due to the interference.
  A frequency diversity effect can be achieved by combining the initial transmission packet and the retransmission packet by means of an Incremental Redundancy scheme, for example. Thus, the likelihood that the mobile station successfully receives the retransmission packet can be improved.

Eleventh Embodiment

Figure 16:
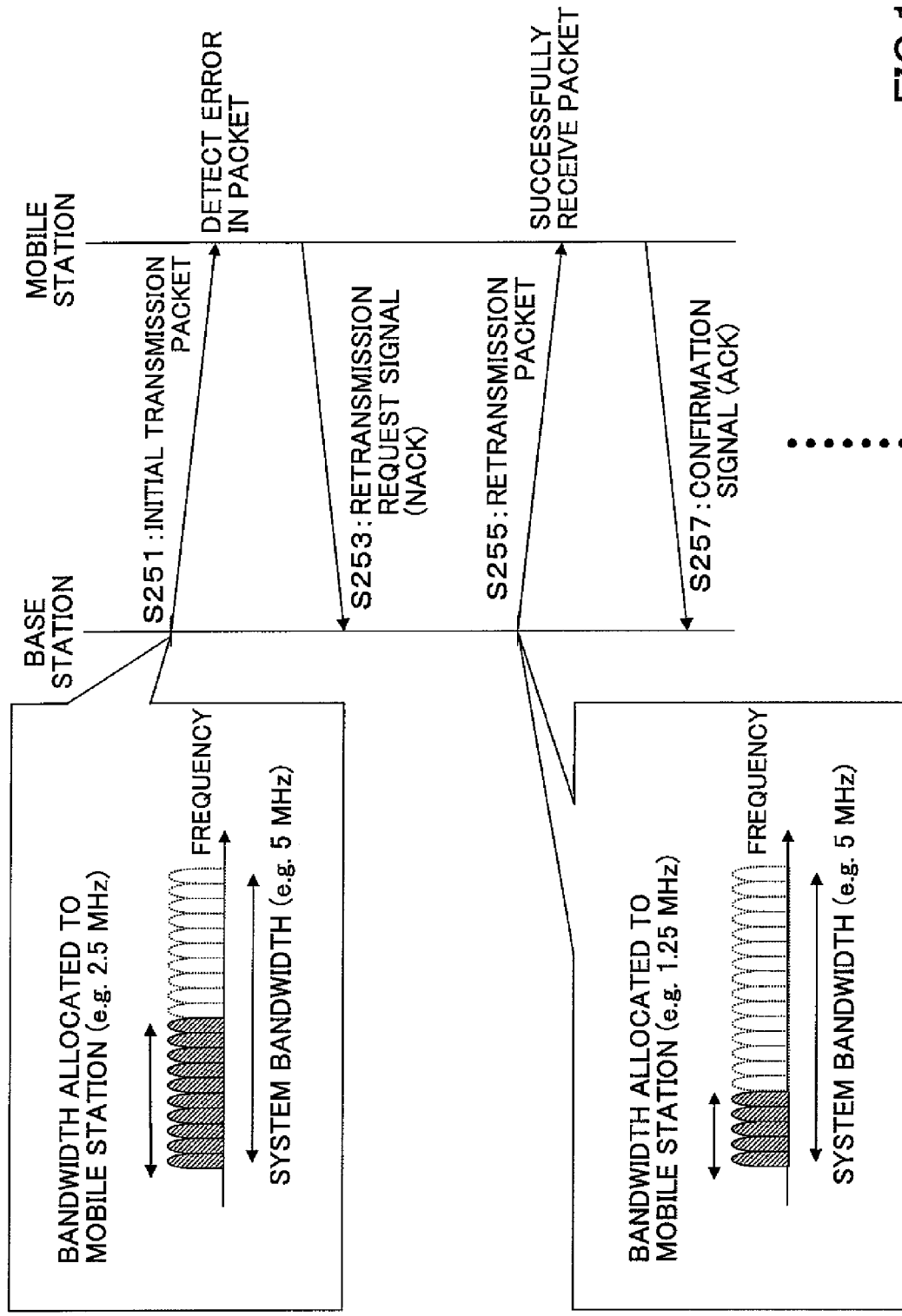
FIG. 16 shows a sequence diagram of a retransmission control scheme in accordance with an eleventh embodiment of the present invention.

FIG. 16 shows a sequence diagram of a retransmission control scheme in accordance with an eleventh embodiment of the present invention. In the eleventh embodiment, a frequency bandwidth for a retransmission packet is controlled.

As is the case with the tenth embodiment, a base station transmits a transmission packet with a predetermined format upon transmitting data to a mobile station (S251). For example, assuming that a system bandwidth is equal to 5 MHz, the base station transmits the transmission packet with a frequency bandwidth of 2.5 MHz. The mobile station receives the transmission packet and detects an error in the packet. If the mobile station fails to receive the transmission packet successfully, the mobile station transmits a retransmission request signal (NACK) to the base station (S253).

When the base station receives the retransmission request signal (NACK), the base station transmits a retransmission packet according to Synchronous ARQ or Asynchronous ARQ (S255). In the eleventh embodiment, the base station transmits the retransmission packet with a frequency bandwidth of 1.25 MHz, for example, when the system bandwidth is equal to 5 MHz. If the mobile station successfully receives the retransmission packet, the mobile station transmits a confirmation signal (ACK) to the base station (S257).

The eleventh embodiment, where the base station changes the frequency bandwidth for the retransmission packet, has the following advantage:

When the amount of information for the retransmission packet is small, excessive bandwidths may not be allocated and the frequency efficiency can be improved.

It should be noted that the frequency bandwidth for the retransmission packet may be reduced for a user situated at a cell edge, for example, when the frequency bandwidth for the initial transmission packet is too large for the mobile station to receive it successfully. The base station can concentrate transmission power in the reduced frequency bandwidth. As a result, the likelihood that the mobile station successfully receives the retransmission packet can be improved.

Twelfth Embodiment

Figure 17:
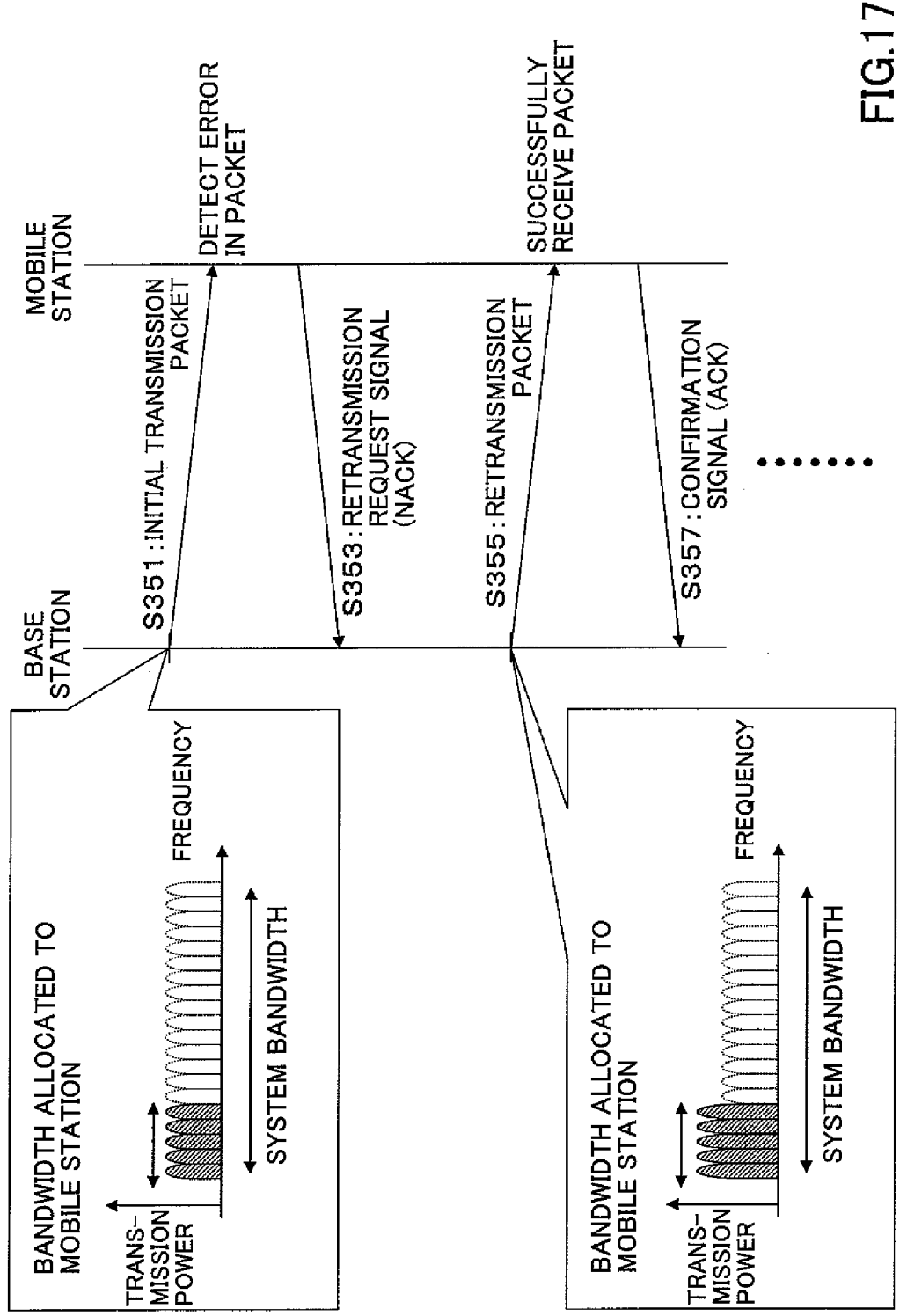
FIG. 17 shows a sequence diagram of a retransmission control scheme in accordance with a twelfth embodiment of the present invention.

FIG. 17 shows a sequence diagram of a retransmission control scheme in accordance with a twelfth embodiment of the present invention. In the twelfth embodiment, transmission power for a retransmission packet is controlled.

As is the case with the tenth embodiment, a base station transmits a transmission packet with a predetermined format upon transmitting data to a mobile station (S351). For example, the base station transmits the transmission packet with normal transmission power. The mobile station receives the transmission packet and detects an error in the packet. If the mobile station fails to receive the transmission packet successfully, the mobile station transmits a retransmission request signal (NACK) to the base station (S353).

When the base station receives the retransmission request signal (NACK), the base station transmits a retransmission packet according to Synchronous ARQ or Asynchronous ARQ (S355). In the twelfth embodiment, the base station transmits the retransmission packet with higher transmission power. Alternatively, the base station may transmit the retransmission packet with lower transmission power. If the mobile station successfully receives the retransmission packet, the mobile station transmits a confirmation signal (ACK) to the mobile station (S357).

The twelfth embodiment has the following advantage in the case where the base station increases the transmission power:

The likelihood that the mobile station successfully receives the retransmission packet can be improved compared to the likelihood for the initial transmission packet, due to higher transmission power.

The twelfth embodiment has the following advantage in the case where the base station decreases the transmission power:

Assuming that the initial transmission packet and the retransmission packet are combined, reception quality can be improved by combining them. Accordingly, transmission power for the retransmission packet can be reduced and interference affecting the other users can be reduced.

In the tenth through twelfth embodiments, a frequency allocation position, a frequency bandwidth, and transmission power are respectively controlled. In the same manner, multiple parameters including a channel coding rate and a data modulation scheme in addition to these three parameters may be simultaneously controlled. A spreading factor or a puncturing pattern for the retransmission packet may be also controlled. It should be noted that the puncturing pattern refers to a pattern representing how redundant bits are punctured (reduced) in the retransmission packet.

[Structure of a Base Station in Accordance with the Tenth Through Twelfth Embodiments]

Figure 18:
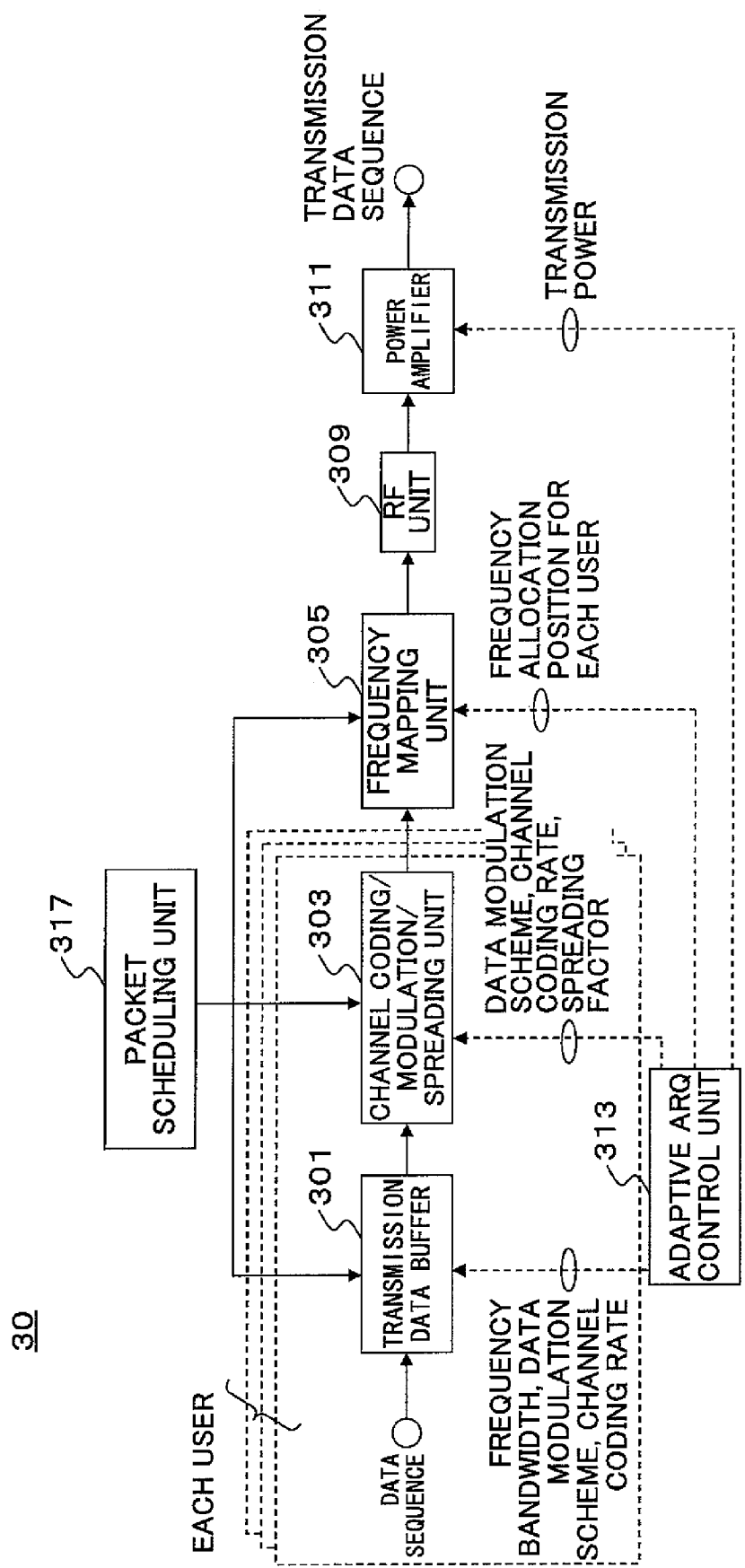
FIG. 18 shows a block diagram of a base station in accordance with an embodiment of the present invention.

FIG. 18 shows a block diagram of a base station 30 in accordance with the tenth through twelfth embodiments of the present invention. The base station 30 includes transmission data buffers 301, channel coding/modulation/spreading units 303, a frequency mapping unit 305, an RF (Radio Frequency) unit 309, a power amplifier 311, an Adaptive ARQ control unit (hereinafter referred to as a control unit) 313, and a packet scheduling unit 317. The data buffer 301 and the channel coding/modulation/spreading units 303 are provided for each user, in order for the base station to control multiple users. The packet scheduling unit 317 allocates a radio resource to each user.

As described above, in response to a retransmission request signal (NACK) from a mobile station, the base station 30 generates and transmits a retransmission packet to the mobile station. Specifically, the transmission data buffer 301 receives information about a frequency bandwidth, a data modulation scheme, and a channel coding rate from the control unit 313 and the packet scheduling unit 317 and temporarily stores data for the retransmission packet. The channel coding/modulation/spreading unit 303 receives information about the data modulation scheme, the channel coding rate, and a spreading factor from the control unit 313 and the packet scheduling unit 317 and performs channel coding/modulation/spreading for the retransmission packet using these parameters. The channel coding/modulation/spreading unit 303 may perform channel coding and modulation after bit repetition. Alternatively, the channel coding/modulation/spreading unit 303 may puncture redundant bits by means of a predetermined puncturing pattern. The frequency mapping unit 305 receives information about a frequency allocation position from the control unit 313 and the packet scheduling unit 317 and maps the retransmission packet to the frequency allocation position. The RF unit 309 performs RF front-end processing such as orthogonal modulation. The power amplifier 311 receives information about transmission power from the control unit 313 and amplifies power up to the transmission power.

Thirteenth Embodiment

Figure 19:
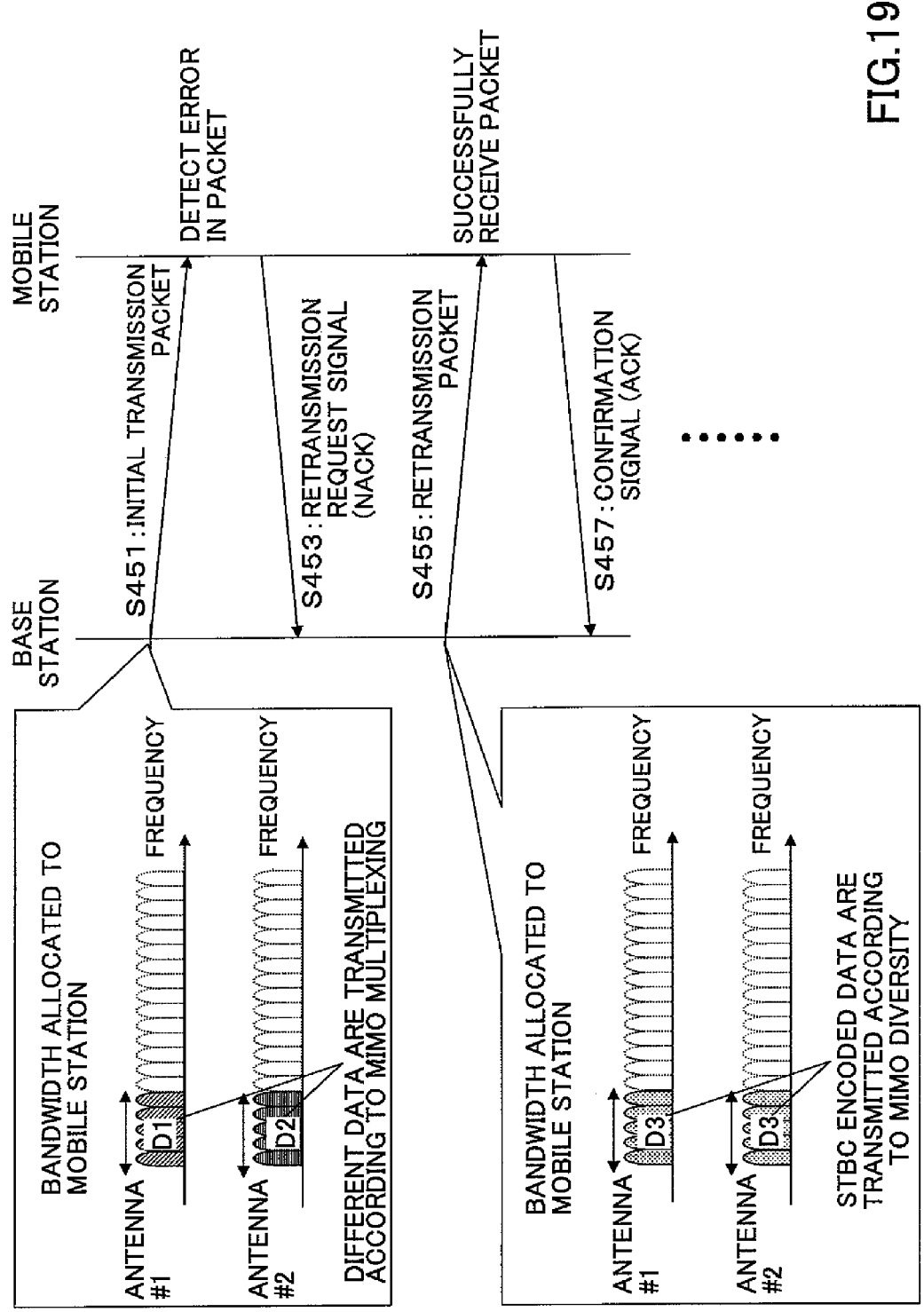
FIG. 19 shows a sequence diagram of a retransmission control scheme in accordance with a thirteenth embodiment of the present invention.

FIG. 19 shows a sequence diagram of a retransmission control scheme in accordance with a thirteenth embodiment of the present invention. In the thirteenth embodiment, a transmission mode for a retransmission packet is controlled, when MIMO transmission is performed between a base station and a mobile station.

As is the case with the tenth embodiment, a base station transmits a transmission packet with a predetermined transmission mode from multiple antennas upon transmitting data to a mobile station (S451). For example, the base station transmits different data from the respective antennas according to MIMO multiplexing. Specifically, the base station transmits data D1 and D2 from antennas #1 and #2, respectively. The mobile station receives the transmission packet and detects an error in the packet. If the mobile station fails to receive the transmission packet successfully, the mobile station transmits a retransmission request signal (NACK) to the base station (S453).

When the base station receives the retransmission request signal (NACK), the base station transmits a retransmission packet according to Synchronous ARQ or Asynchronous ARQ (S455). In the thirteenth embodiment, the base station transmits the STBC (Space-Time Block Coding) encoded data D3 from the respective antennas according to MIMO diversity, for example. When data D1 and D2 are jointly encoded, data D3 may include redundancy bits used for decoding data D1 and D2. Alternatively, when data D1 and D2 are separately encoded, data D3 may include redundancy bits used for decoding erroneous data D1 or D2. If the mobile station successfully receives the retransmission packet, the mobile station transmits a confirmation signal (ACK) to the mobile station (S457).

The thirteenth embodiment, where the base station changes the transmission mode for the retransmission packet, has the following advantage:

A transmission diversity effect can be achieved by MIMO diversity as shown in FIG. 19. Accordingly, reception quality can be improved compared to the case where only MIMO multiplexing is used. Thus, a retransmission effect can be also improved by combining the initial transmission packet and the retransmission packet.

It should be noted that the number of transmitting antennas may be controlled in such a manner that two antennas are used for transmitting the transmission packet and one antenna is used for transmitting the retransmission packet.

Fourteenth Embodiment

In the tenth through thirteenth embodiments, a parameter for a retransmission packet is controlled. In a fourteenth embodiment, a pattern used for controlling the parameter is described.

In the case of Adaptive ARQ, both the base station and the mobile station must store common information about how to change a data modulation scheme, a channel coding rate, a puncturing pattern, a spreading factor, a frequency bandwidth, a frequency allocation position, and transmission power (as well as the number of transmitting antennas and a transmission mode in the case of MIMO transmission) as parameters for the retransmission packet.

For example, both the base station and the mobile station store a common table shown in FIG. 8. The table shown in FIG. 8 represents a pattern used for changing the parameters for the retransmission packet from those of the transmission packet. It should be noted that some fixed parameters may not be included in the table.

The base station determines a format for the retransmission packet with parameters, such as a data modulation scheme, a channel coding rate, a puncturing pattern, a spreading factor, a frequency bandwidth, a frequency allocation position, transmission power, the number of transmitting antennas, and a transmission mode, referring to the table, upon transmitting the retransmission packet. Because the mobile station also stores the common table, the mobile station can determine the format for the retransmission packet upon receiving the retransmission packet, and thus demodulate and decode the retransmission packet.

According to the fourteenth embodiment, where both the mobile station and the base station store the common table in advance, control signals transmitted from the mobile station to the base station can be eliminated, such as control signals for specifying a format which will be applied or has been applied to the retransmission packet. Thus, overhead for control signals can be reduced.

Figure 20:
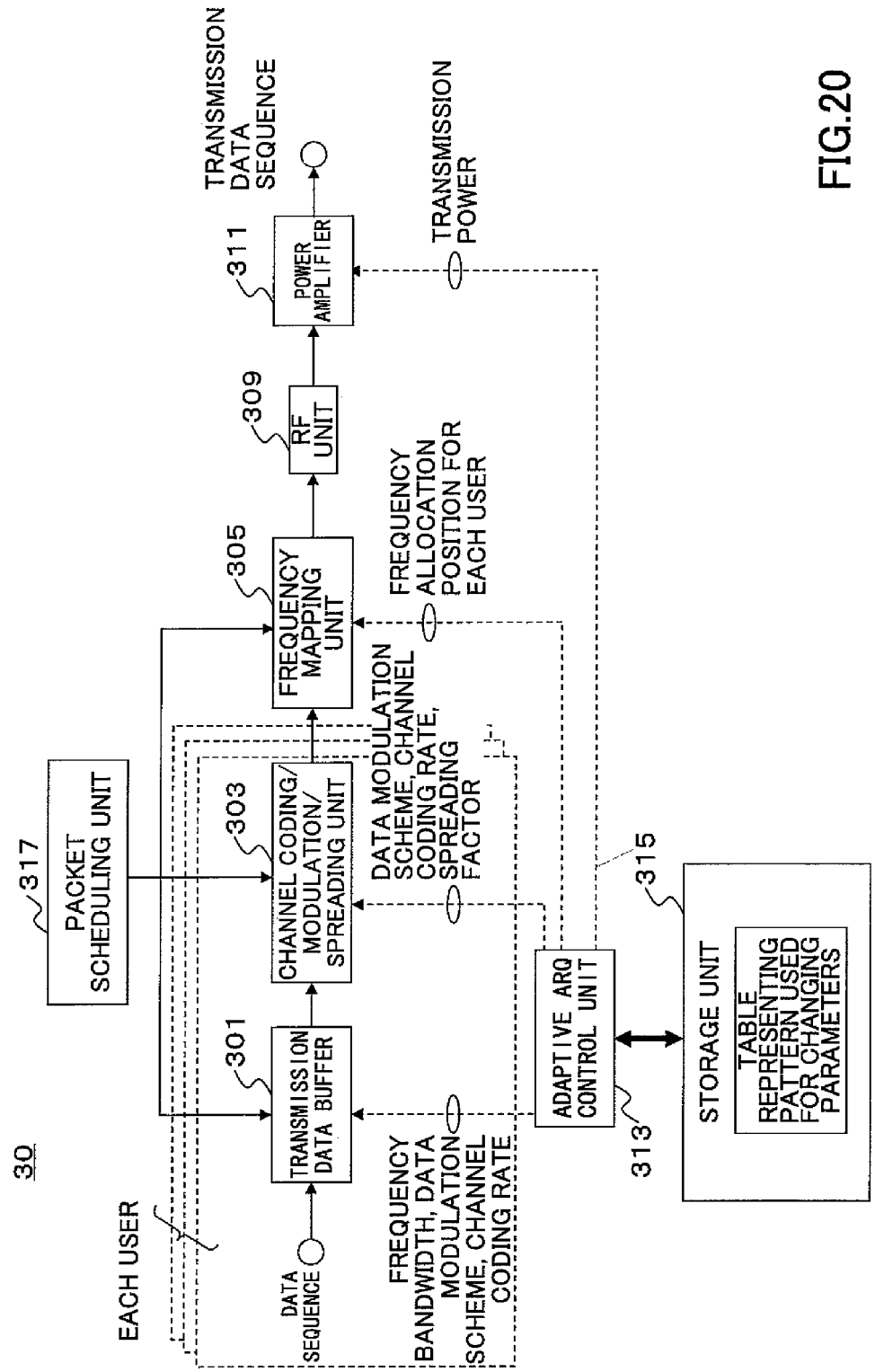
FIG. 20 shows a block diagram of a base station in accordance with a fourteenth embodiment of the present invention.

FIG. 20 shows a block diagram of a base station 30 in accordance with the fourteenth embodiment of the present invention.

The base station 30 shown in FIG. 20 is identical with the base station shown in FIG. 18 except for a storage unit 315. The storage unit 315 stores a table, as shown in FIG. 8, representing a pattern used for changing parameters according to Adaptive ARQ. The control unit 313 determines parameters for a retransmission packet referring to the pattern stored in the storage unit 315 upon transmitting the retransmission packet. The control unit 313 provides the parameters to the respective units 301-311 in order to transmit the retransmission packet.

Fifteenth Embodiment

FIG. 21 shows a sequence diagram of a retransmission control scheme in accordance with a fifteenth embodiment of the present invention. In the fifteenth embodiment, a pattern used for changing parameters for a retransmission packet (or a format for a retransmission packet) is transmitted from a base station to a mobile station.

As is the case with the tenth embodiment, a base station transmits a transmission packet with a predetermined format upon transmitting data to a mobile station (S651). The mobile station receives the transmission packet and detects an error in the packet. If the mobile station fails to receive the transmission packet successfully, the mobile station transmits a retransmission request signal (NACK) to the base station (S653).

When the base station receives the retransmission request signal (NACK), the base station transmits a retransmission packet according to Synchronous ARQ or Asynchronous ARQ (S655). In the fifteenth embodiment, the base station determines a format for the retransmission packet and transmits a control signal which specifies a pattern used for changing parameters for the retransmission packet. Alternatively, the base station may transmit a control signal which specifies the format (individual parameters) for the retransmission packet. The mobile station modulates and decodes the retransmission packet with the parameters specified by the control signal. If the mobile station successfully receives the retransmission packet, the mobile station transmits a confirmation signal (ACK) to the base station (S657).

According to the fifteenth embodiment, where the base station specifies the format for the retransmission packet, the common table in the fourteenth embodiment is not needed. Although the number of bits transmitted from the base station to the mobile station grows due to the control signal, a retransmission effect can be improved, because the base station can select suitable parameters in consideration of interference with neighbor cells or frequency allocation information for the other users.

FIG. 22 shows a block diagram of a base station 30 in accordance with the fifteenth embodiment of the present invention.

The base station 30 shown in FIG. 22 is identical with the base station shown in FIG. 18 except for a control signal generating unit 319. The control signal generating unit 319 receives a format for a retransmission packet from the control unit 313 and generates a control signal including the format. The control signal generated by the control signal generating unit 319 is transmitted to the mobile station along with the retransmission packet. The mobile station can demodulate and decode the retransmission packet based on the format specified by the control signal.

As described above, the parameters transmitted as the control signal to the mobile station include a data modulation scheme, a channel coding rate, a puncturing pattern, a spreading factor, a frequency bandwidth, a frequency allocation position, transmission power, the number of antennas (for example, one antenna or two antennas), a transmission mode (for example, MIMO diversity or MIMO multiplexing), a redundancy scheme used for encoding the packet, and information about whether the packet corresponds to the retransmission packet.

The control signal generating unit 319 may further generate, as a control signal for the synchronous retransmission control scheme, a user identification signal or a signal indicating either initial transmission or retransmission (a signal indicating whether the packet corresponds to the initial transmission packet or the retransmission packet). The base station may transmit the user identification signal to the mobile station in the case of the initial transmission packet and may not transmit the user identification signal in the case of the retransmission packet.

The control signal generating unit 319 may further generate, as a control signal for the asynchronous retransmission control scheme, a process number for the asynchronous retransmission control scheme, a user identification signal, and a signal indicating either initial transmission or retransmission.

Sixteenth Embodiment

In a sixteenth embodiment of the present invention, some parameters are controlled based on common information stored in both a base station and a mobile station as described in the fourteenth embodiment. Some parameters are controlled based on a control signal transmitted from the base station to the mobile station, as described in the fifteenth embodiment.

In the following example, four parameters including a data modulation scheme, a frequency bandwidth, a frequency allocation position, and a channel coding rate (and a redundancy scheme used for encoding a packet) are controlled. The data modulation scheme and the frequency bandwidth are parameters with a significantly varying property depending upon a pattern used for changing parameters. On the other hand, the frequency allocation position and the channel coding rate (and the redundancy scheme used for encoding a packet) are parameters with a less significantly varying property depending upon the pattern used for changing parameters. Preferably, the parameters with the significantly varying property are transmitted as a control signal from the base station to the mobile station. On the other hand, the parameters with the less significantly varying property may not be transmitted as the control signal. Thus, the parameters with the less significantly varying property may be controlled based on common information stored in both the base station and the mobile station. For example, the channel coding rate is controlled according to a predetermined pattern such that the channel coding rate for the initial transmission packet is equal to ½, that of the first retransmission packet is equal to ⅓, and that of the second retransmission packet is equal to ¼.

According to the sixteenth embodiment, where the fourteenth embodiment and the fifteenth embodiment are combined depending upon the parameter, overhead for control signals can be reduced compared to the fifteenth embodiment, where all the parameters are transmitted as the control signal. Furthermore, according to the sixteenth embodiment, reception quality of the retransmission packet can be improved compared to the fourteenth embodiment, where all the parameters are stored in the base station and the mobile station in common.

Seventeenth Embodiment

In a seventeenth embodiment of the present invention, an item of parameters for a retransmission packet is controlled (selected) depending upon a type of data transmitted on a shared data channel.

Data with various QOS (for example, acceptable delay time, required residual packet error rate, and so on) are transmitted on the shared data channel. In this case, it may be preferable to control (select) an item of parameters depending upon the type of transmitted data.

For example, data are categorized into real-time traffic data such as voice or real-time video and non-real-time traffic data such as download data. For real-time traffic data, data are periodically generated, and thus it is preferable to maintain a constant data rate. In addition, real-time traffic data must typically satisfy strict requirements for delay. In order to maintain the constant data rate, the base station changes transmission power for the retransmission packet from that of the transmission packet, without changing parameters having a large influence on the data rate (for example, a frequency bandwidth, a data modulation scheme, a channel coding rate, a spreading factor). For non-real-time traffic, on the other hand, data are burst-generated and have less strict requirements for delay. Thus, best-effort transmission is allowed for non-real-time traffic. Because the base station need not maintain the constant data rate, the base station changes parameters such as a frequency bandwidth, a data modulation scheme, a channel coding rate, and a spreading factor without changing transmission power. In this manner, parameters for non-real-time traffic data are adaptively controlled to maximize throughput.

According to the seventeenth embodiment, where the item of parameters for the retransmission packet is controlled depending upon the type of data, QoS for the respective traffic data can be efficiently satisfied. The item of parameters for the retransmission packet can be selected as part of packet scheduling in the base station.

The procedure for packet scheduling for uplink transmission is similar to the procedure for downlink transmission as shown in FIG. 13.

Eighteenth Embodiment

In an eighteenth embodiment of the present invention, a parameter for a retransmission packet is adaptively controlled depending upon a size of the retransmission packet.

As shown in FIG. 14, changing the size of the retransmission packet depending upon reliability of the erroneous initial transmission packet can improve the frequency efficiency. According to an Incremental Redundancy scheme for combining the initial transmission packet and the retransmission packet, for example, the number of redundant bits in the retransmission packet can be controlled depending upon the reliability of the initial transmission packet. For the initial transmission packet with high reliability, the number of redundant bits can be small. For the initial transmission packet with low reliability, the number of redundant bits can be large.

In this manner, under Adaptive ARQ, the parameter for the retransmission packet is adaptively controlled depending upon the number of redundant bits in the retransmission packet. For example, when the size of the retransmission packet is small, a narrower frequency bandwidth is allocated to the retransmission packet. On the contrary, when the size of the retransmission packet is large, a wider frequency bandwidth is allocated to the retransmission packet. According to the eighteenth embodiment, the frequency efficiency can be improved.

As described above, according to an embodiment of the present invention, reception quality of a retransmission packet can be improved.

The present invention is not limited to the specifically disclosed embodiments, and variations and modifications may be made without departing from the scope of the present invention.

This international patent application is based on Japanese Priority Application No. 2006-031748 filed on Feb. 8, 2006, the entire contents of which are incorporated herein by reference.

What is claimed is:

1. A mobile station for transmitting a retransmission packet corresponding to a transmission packet to a base station according to a synchronous retransmission control scheme in single-carrier FDMA (Frequency Division Multiple Access) radio access, comprising:
a control unit configured to change at least one parameter for the retransmission packet from that of the transmission packet, where the at least one parameter is selected from
a data modulation scheme;
a channel coding rate;
a puncturing pattern;
a spreading factor;
a frequency bandwidth;
a frequency allocation position;
transmission power; and
a storage unit configured to store a pattern used for changing the parameter for the retransmission packet, the pattern being common to the base station and the mobile station, wherein
the control unit changes a first portion of the at least one parameter for the retransmission packet based on a control signal transmitted from the base station; and
the control unit changes a second portion of the at least one parameter for the retransmission packet based on the pattern stored in the storage unit.

2. The mobile station as claimed in claim 1, wherein:
when MIMO transmission is performed between the base station and the mobile station,
the control unit changes the at least one parameter for the retransmission packet from that of the transmission packet, where the at least one parameter is selected from
the number of transmitting antennas; and
a transmission mode.

3. The mobile station as claimed in claim 1, wherein:
the control unit identifies a type of data transmitted from the mobile station to the base station and selects an item of the at least one parameter for the retransmission packet depending upon the identified type of data.

4. The mobile station as claimed in claim 1, wherein:
the control unit identifies a size of the retransmission packet and changes the at least one parameter for the retransmission packet depending upon the identified size of the retransmission packet.

5. A base station for transmitting a control signal to a mobile station for transmitting a retransmission packet corresponding to a transmission packet according to a synchronous retransmission control scheme in single-carrier FDMA (Frequency Division Multiple Access) radio access, comprising:
a retransmission format determining unit configured to determine a pattern used for changing at least one parameter for the retransmission packet from that of the transmission packet to determine a format for the retransmission packet, where the at least one parameter is selected from
a data modulation scheme;
a channel coding rate;
a puncturing pattern;
a spreading factor;
a frequency bandwidth;
a frequency allocation position; and
transmission power; and
a control signal generating unit configured to generate the control signal based on the format for the retransmission packet determined by the retransmission format determining unit, wherein
the retransmission format determining unit divides the at least one parameter for the retransmission packet into a first portion which is changed based on the control signal and a second portion which is changed based on common information stored in both the base station and the mobile station, and
the control signal generating unit generates the control signal for the first portion.

6. The base station as claimed in claim 5, wherein:
the retransmission format determining unit identifies a type of data transmitted from the mobile station and selects an item of the at least one parameter for the retransmission packet depending upon the identified type of data to determine the format for the retransmission packet.

7. A base station for transmitting a retransmission packet corresponding to a transmission packet to a mobile station in multi-carrier OFDM (Orthogonal Frequency Division Multiplexing) radio access, comprising:
a control unit configured to change at least one parameter for the retransmission packet from that of the transmission packet, where the at least one parameter is selected from
a data modulation scheme;
a channel coding rate;
a puncturing pattern;
a spreading factor;
a frequency bandwidth;
a frequency allocation position; and
transmission power; and
a control signal generating unit configured to generate, as a control signal to the mobile station, a pattern used for the control unit to change a first portion of the at least one parameter for the retransmission packet; wherein
the control unit changes a second portion of the at least one parameter for the retransmission packet based on common information stored in both the base station and the mobile station.

8. The base station as claimed in claim 7, wherein:
when MIMO transmission is performed between the base station and the mobile station,
the control unit changes the at least one parameter for the retransmission packet from that of the transmission packet, where the at least one parameter is selected from
the number of transmitting antennas; and
a transmission mode.

9. The base station as claimed in claim 7, wherein:
the control signal generating unit further generates, as a control signal for a synchronous retransmission control scheme, a signal indicating either initial transmission or retransmission.

10. The base station as claimed in claim 9, wherein:
the control signal generating unit further generates a user identification signal when the control signal indicates the initial transmission and does not generate the user identification signal when the control signal indicates the retransmission.

11. The base station as claimed in claim 7, wherein:
the control signal generating unit further generates, as a control signal for an asynchronous retransmission control scheme, a process number for the asynchronous retransmission control scheme, a user identification signal, and a signal indicating either initial transmission or retransmission.

12. The base station as claimed in claim 7, wherein:
the control unit identifies a type of data transmitted from the base station to the mobile station and selects an item of the at least one parameter for the retransmission packet depending upon the identified type of data.

13. The base station as claimed in claim 7, wherein:
the control unit identifies a size of the retransmission packet and changes the at least one parameter for the retransmission packet depending upon the identified size of the retransmission packet.

* * * * *